United States Patent
Nam

(10) Patent No.: US 10,067,611 B2
(45) Date of Patent: Sep. 4, 2018

(54) APPARATUS AND METHOD FOR DETECTING A TOUCH

(75) Inventor: Sung-Sik Nam, Seoul (KR)

(73) Assignee: Melfas Inc., Seongnam-si, Gyeonggi-do (KR)

( * ) Notice: Subject to any disclaimer, the term of this patent is extended or adjusted under 35 U.S.C. 154(b) by 570 days.

(21) Appl. No.: 14/349,759

(22) PCT Filed: Nov. 17, 2011

(86) PCT No.: PCT/KR2011/008786
§ 371 (c)(1),
(2), (4) Date: Apr. 4, 2014

(87) PCT Pub. No.: WO2013/051752
PCT Pub. Date: Apr. 11, 2013

(65) Prior Publication Data
US 2014/0240291 A1     Aug. 28, 2014

(30) Foreign Application Priority Data

Oct. 5, 2011 (KR) .................. 10-2011-0101432

(51) Int. Cl.
    *G06F 3/044*     (2006.01)
    *G06F 3/041*     (2006.01)

(52) U.S. Cl.
CPC ............ *G06F 3/044* (2013.01); *G06F 3/0416* (2013.01); *G06F 2203/04111* (2013.01)

(58) Field of Classification Search
CPC ................................. G06F 3/044; G06F 3/0416
(Continued)

(56) References Cited

U.S. PATENT DOCUMENTS 6,323,846 B1 * 11/2001 Westerman ........... G06F 3/0235
                                                                      345/173
7,663,607 B2     2/2010   Hotelling et al.
(Continued)

FOREIGN PATENT DOCUMENTS

KR    10-2008-0081411 A    9/2008
KR    10-2009-0071374 A    7/2009
(Continued)

OTHER PUBLICATIONS

PCT International Search Report and Written Opinion, PCT/KR2011/008786, dated Oct. 24, 2012, 5 Pages.

*Primary Examiner* — Kent Chang
*Assistant Examiner* — Mark Edwards
(74) *Attorney, Agent, or Firm* — Fenwick & West LLP

(57) ABSTRACT

There is disclosed an apparatus for detecting touch including a touch element comprising a plurality of touch detecting electrodes arranged therein, a touch element controller for acquiring detection signals from the touch detection electrodes and determining presence of touch in the touch element, wherein the touch element controller includes a receiving unit for receiving the detection signals from the touch detection electrodes and grouping the detection signals into one or more detection signal groups, a memory for storing a detection signal value limit, a signal extracting unit for extracting the maximum detection value out of the detection signal values of the detection for each of the detection signals, a calculating unit for calculating an adjustment variable by deducting the detection signal value limit from the maximum detection signal value for each of the detection groups, and a touch determination unit for determining presence of touch in the touch element, using the adjustment variable.

18 Claims, 21 Drawing Sheets

(58) Field of Classification Search
USPC .................................................. 345/174–179
See application file for complete search history.

(56) References Cited

U.S. PATENT DOCUMENTS

| | | | |
|---|---|---|---|
| 2006/0097991 A1 | 5/2006 | Hotelling et al. | |
| 2008/0158185 A1* | 7/2008 | Westerman ........... | G06F 3/0488 345/173 |
| 2009/0167713 A1 | 7/2009 | Edwards | |
| 2010/0060568 A1* | 3/2010 | Fisher ................. | G06F 3/03547 345/156 |
| 2010/0225617 A1* | 9/2010 | Yoshimoto .............. | G06F 3/042 345/175 |
| 2011/0187677 A1* | 8/2011 | Hotelling .............. | G06F 3/0412 345/174 |
| 2011/0279409 A1* | 11/2011 | Salaverry .............. | G06F 3/0416 345/174 |
| 2012/0162094 A1* | 6/2012 | Kent ................... | G06F 3/03547 345/173 |

FOREIGN PATENT DOCUMENTS

| | | |
|---|---|---|
| KR | 10-2010-0006650 A | 1/2010 |
| KR | 10-2010-0032283 A | 3/2010 |
| KR | 10-2011-0002125 A | 1/2011 |
| KR | 10-2011-0003385 A | 1/2011 |

* cited by examiner

FIG. 8
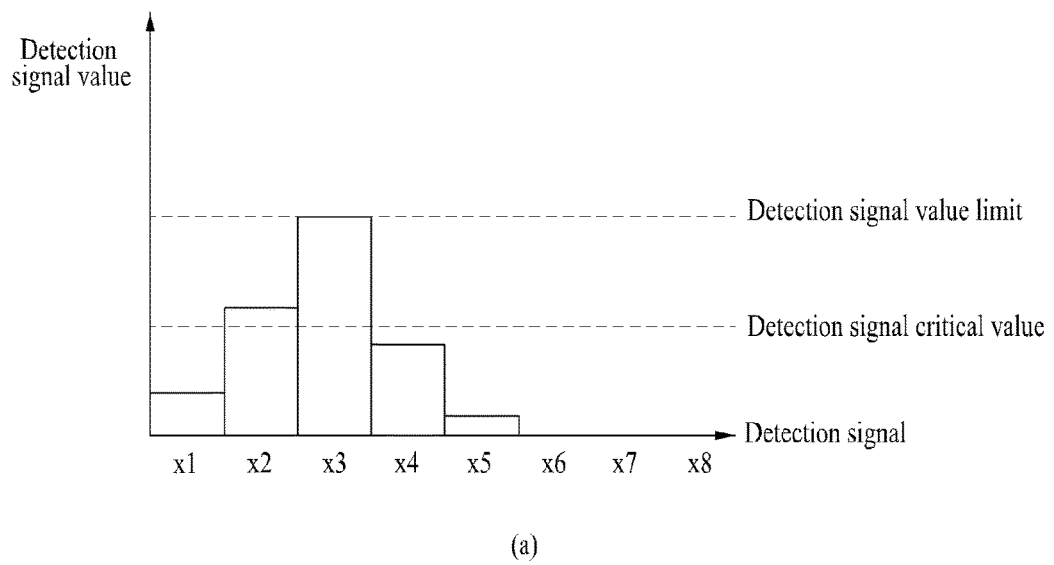
(a)
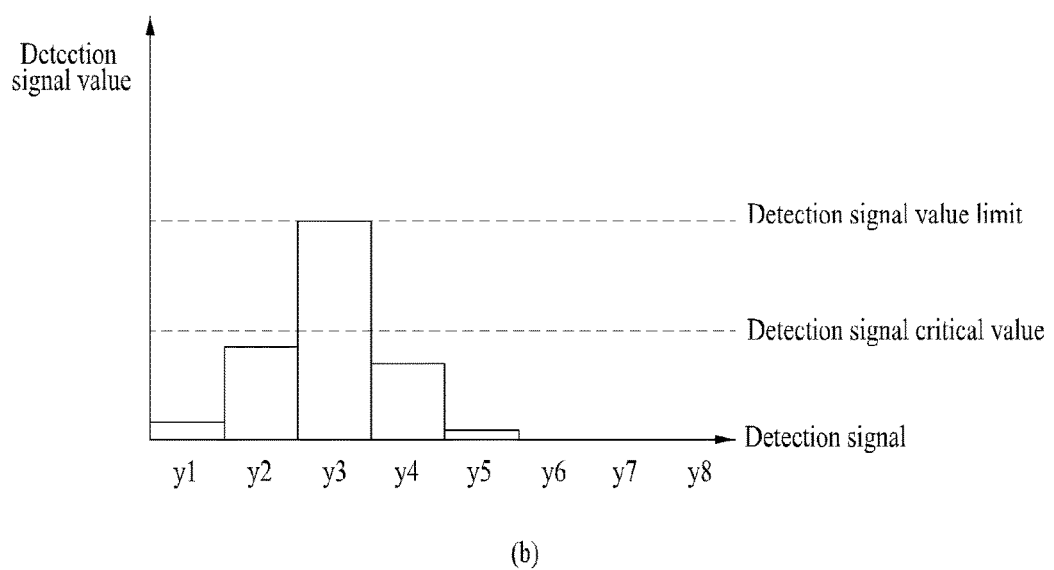
(b)

FIG. 10
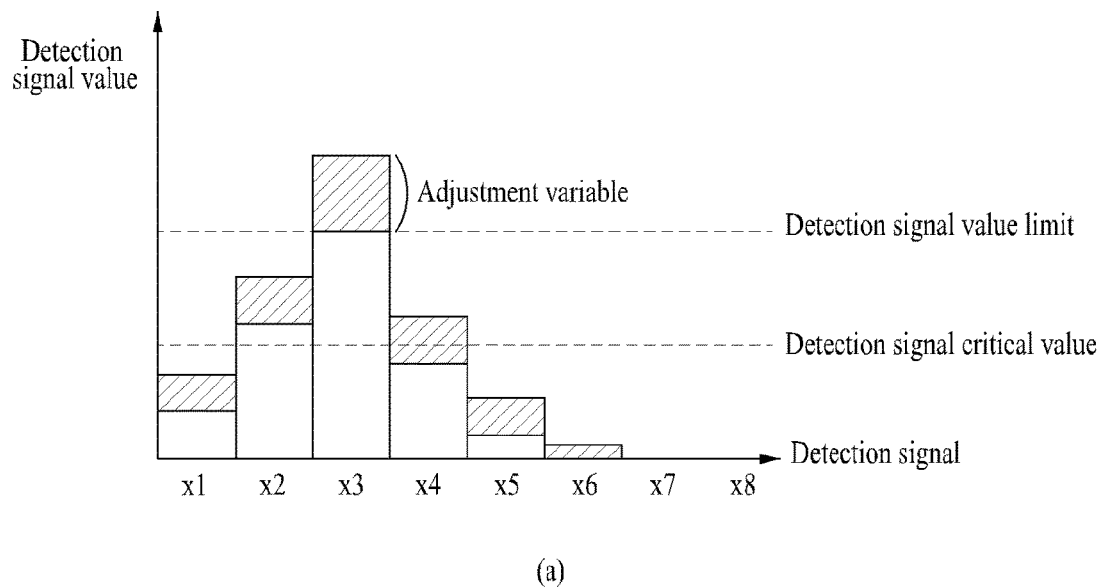
(a)
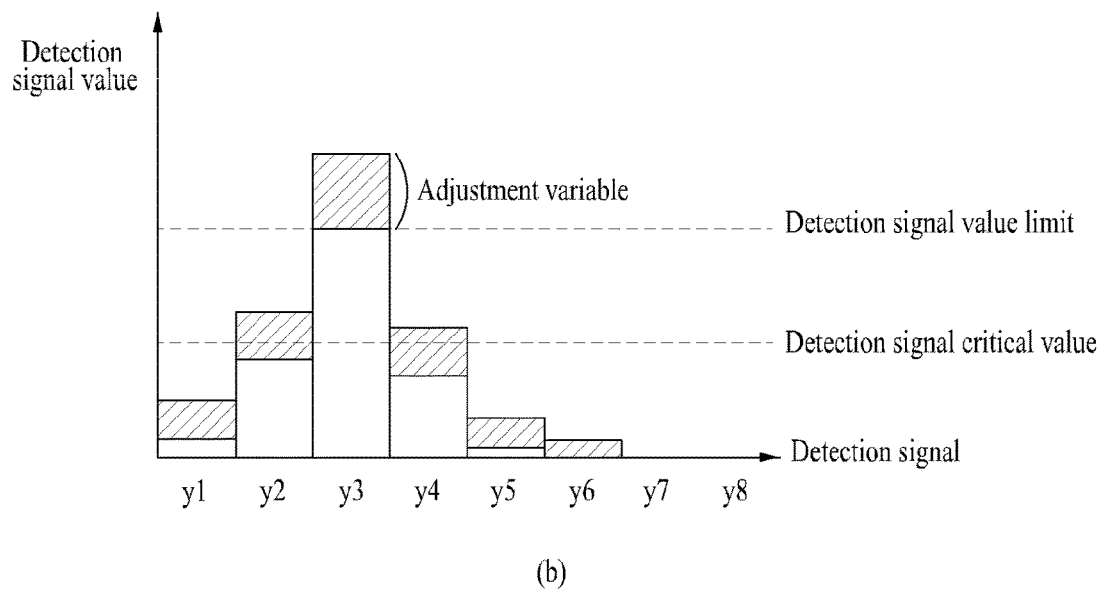
(b)

FIG. 11
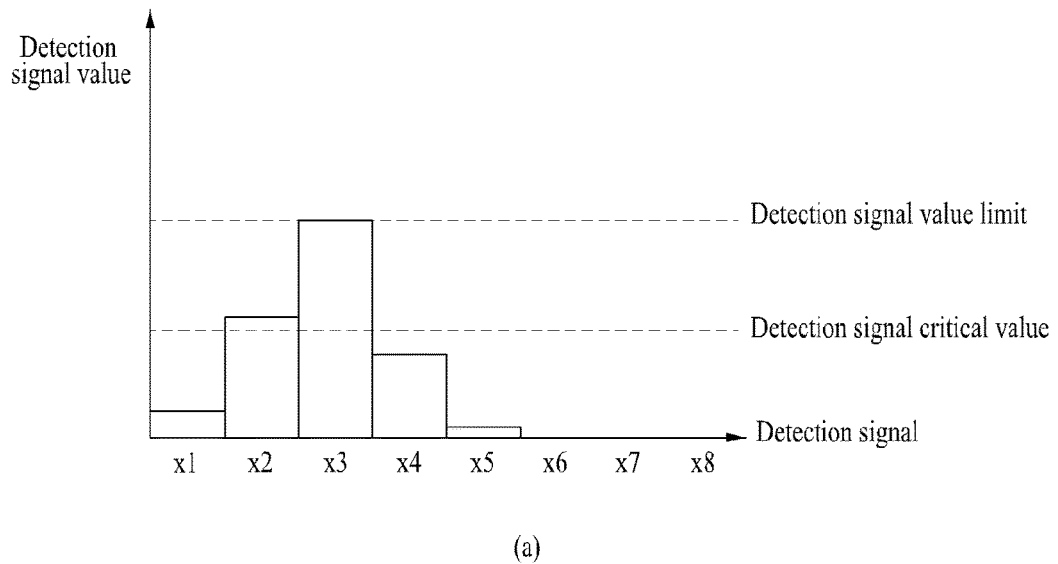
(a)
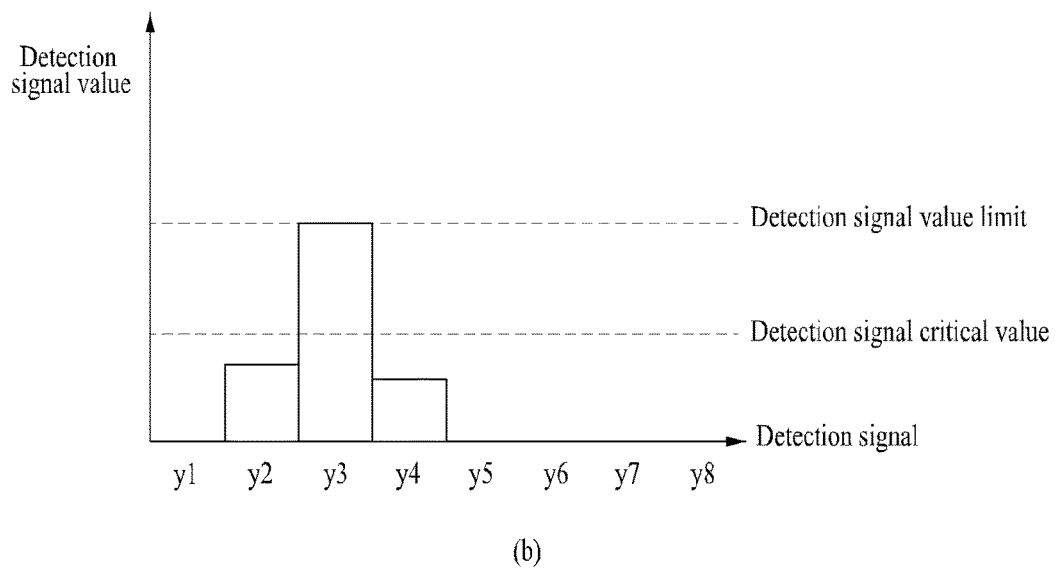
(b)

FIG. 12
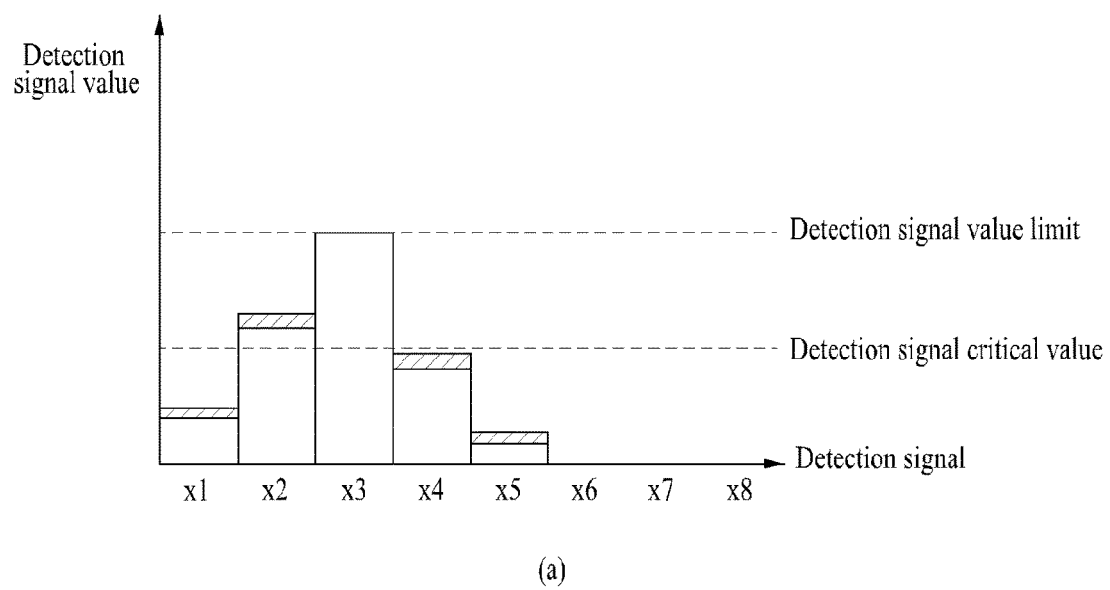
(a)
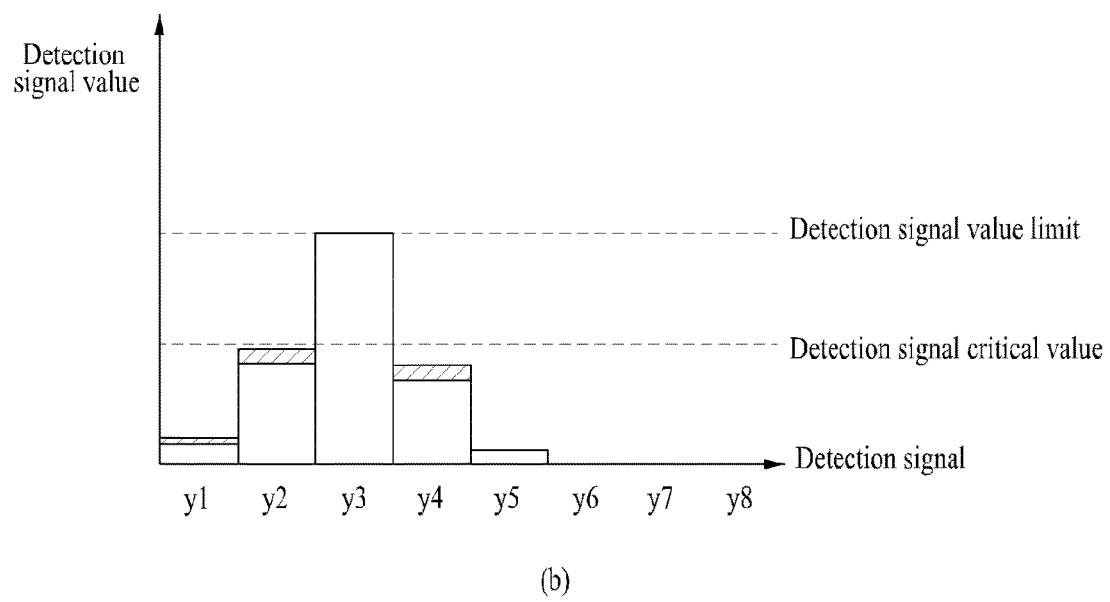
(b)

FIG. 13
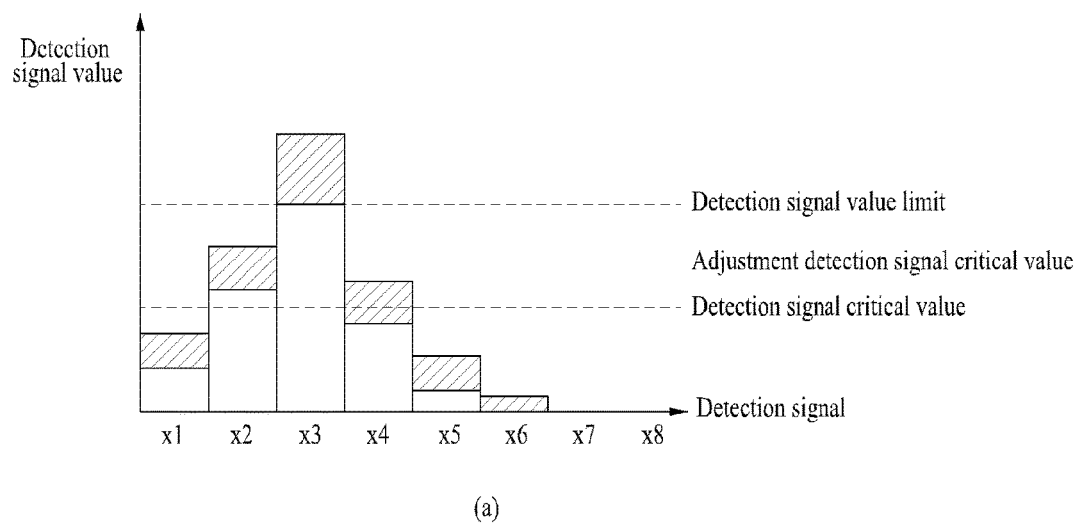
(a)
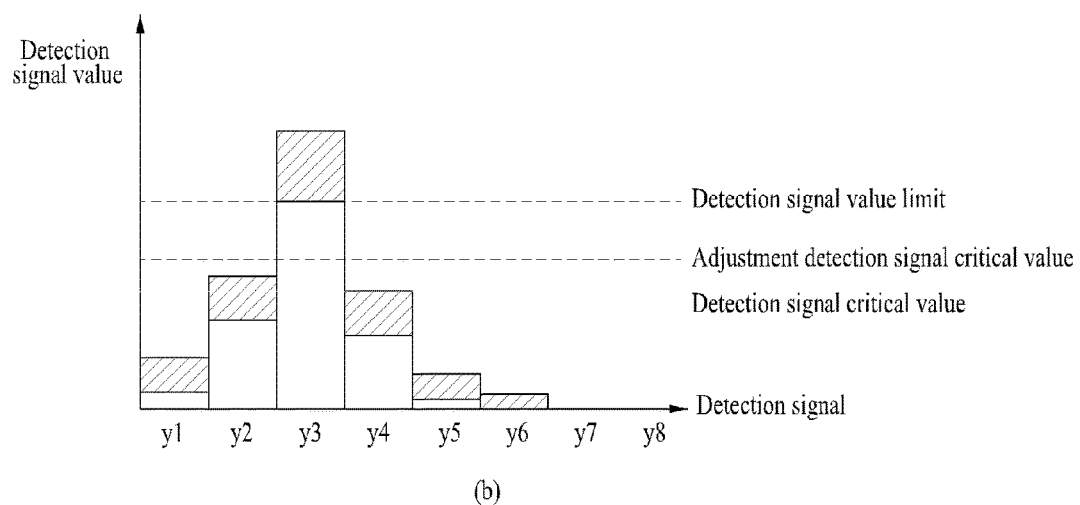
(b)

FIG. 20
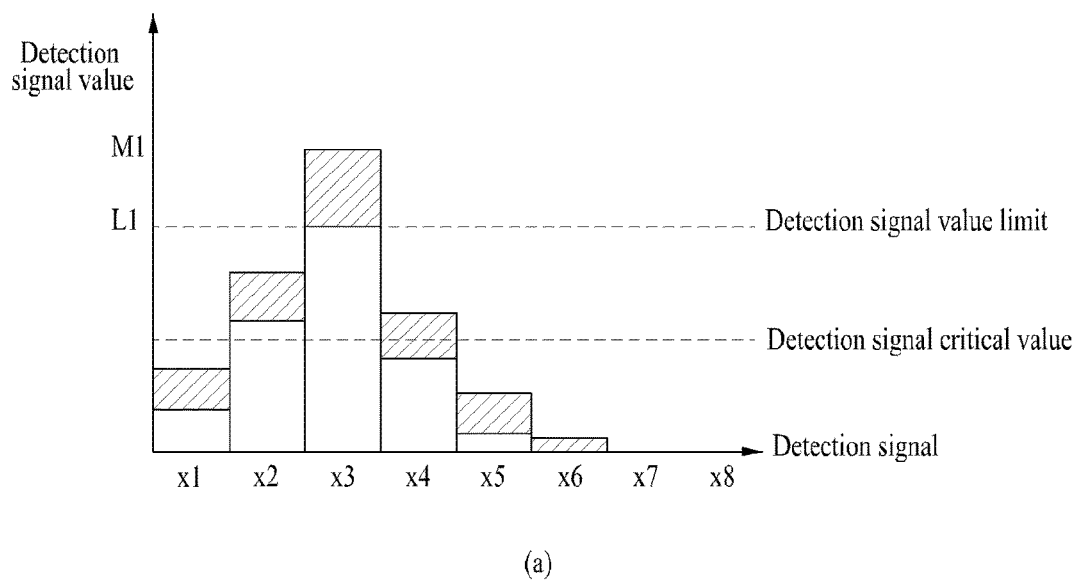
(a)
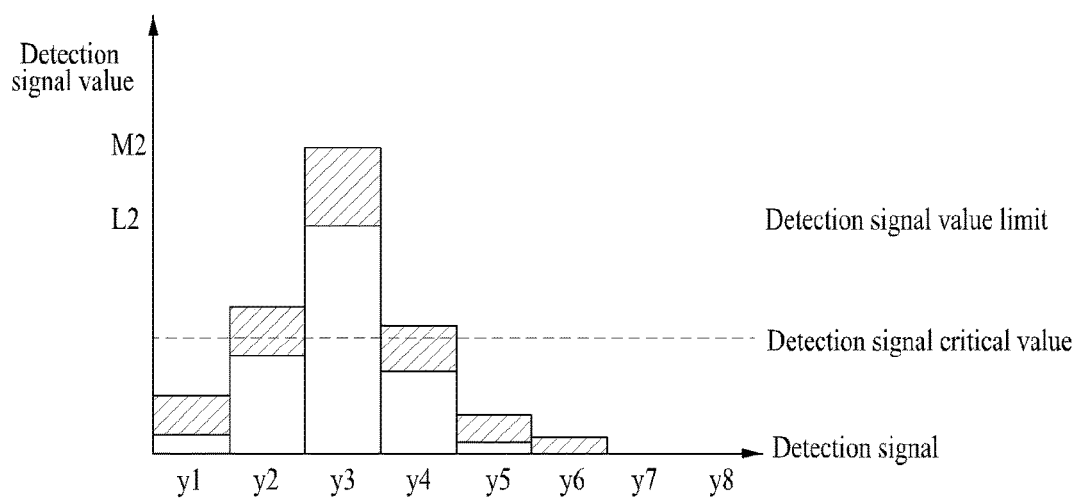
(b)

APPARATUS AND METHOD FOR DETECTING A TOUCH

TECHNICAL FIELD

Exemplary embodiments of the disclosure relate to an apparatus and a method for detecting touch, more particularly, to an apparatus and a method for improving accuracy of touch detection.

BACKGROUND

An apparatus for detecting touch (hereinafter, a touch detecting apparatus) includes a touch panel and recognizes a user's screen touch or gesture as input information. The touch panel provided in the touch detecting apparatus may be categorized into an analog resistive type, a capacitive overlay type, a surface acoustic wave type and an infrared type based on a method for touching. The capacitive overlay type apparatus for detecting touch receives attention of a wide public, because a user can implement multi touch input thereto.

Such a capacitive overlay touch panel uses a principle that capacity is varied by touch input applied to a transparent conductive film or glass. As capacitances are generated, more electric charge accumulates in coordinates input by touch than coordinates not input by touch. A detection circuit analyzes a difference of the electric charges between the coordinates and detects the touch input coordinates based on the analyzed difference.

As the signal detected by the detection circuit reflects presence of touch input more accurately, the accuracy for presence of touch is increased more. However, the size of the detection signal is not determined only by variation of the capacitances generated by touch input. For instance, the detection signal could be mixed with the noise of a capacitance generated by a correlation with a display device arranged behind a touch panel, the noise of a capacitance generated by wiring nearby and the other external noises. Such the noise signals might deteriorate accurate determination of presence of touch input and determination of the number and coordinates of touch inputs in a touch detecting apparatus, especially, in a multi touch detecting apparatus. In case a touch panel is getting enlarged, a physical curling of a touch panel could be increasingly performed and the problem of the noise of a capacitance generated by the correlation with the display arranged behind the touch panel is getting severe.

DISCLOSURE

Technical Problem

Exemplary embodiments of the present disclosure provide an apparatus for detecting touch which has an improved accuracy of touch detection.

Exemplary embodiments of the present disclosure also provide a method for detecting touch which has an improved accuracy of touch detection.

Exemplary embodiments of the present disclosure also provide a method for detecting touch which has an improved accuracy of touch detection by removing noise of the capacitance generated by a correlation with a display device arranged behind a large touch panel with a large curling.

Additional features of the present disclosure will be set forth in the description which follows, and in part will be apparent from the description, or may be learned by practice of the disclosed subject matter.

Technical Solution

To achieve these objects and other advantages and in accordance with the purpose of the invention, as embodied and broadly described herein, an apparatus for detecting touch includes a touch element comprising a plurality of touch detecting electrodes arranged therein; and a touch element controller for acquiring detection signals from the touch detection electrodes and determining presence of touch in the touch element, wherein the touch element controller includes a receiving unit for receiving the detection signals from the touch detection electrodes and grouping the detection signals into one or more detection signal groups; a memory for storing a detection signal value limit; a signal extracting unit for extracting the maximum detection value out of the detection signal values of the detection for each of the detection signals; a calculating unit for calculating an adjustment variable by deducting the detection signal value limit from the maximum detection signal value for each of the detection groups; and a touch determination unit for determining presence of touch in the touch element, using the adjustment variable.

In another aspect, an apparatus for detecting touch includes a touch element comprising a plurality of touch detecting electrodes arranged therein; and a touch element controller for acquiring detection signals from the touch detection electrodes and determining presence of touch in the touch element, wherein the touch element controller includes a receiving unit for receiving the detection signals from the touch detection electrodes and grouping the detection signals into one or more detection signal groups; a memory for storing a detection signal value limit; a signal extracting unit for extracting the maximum detection value out of the detection signal values of the detection for each of the detection signals; a calculating unit for calculating an adjustment variable by deducting the detection signal value limit from the maximum detection signal value for each of the detection groups; and a touch determination unit for determining presence of touch in the touch element, using the adjustment variable.

In a further aspect, an apparatus for detecting touch includes a display panel for displaying an image; a display panel controller for driving the display panel; a touch element arranged on one surface of the display panel, the touch element comprising a plurality of touch detecting electrodes arranged therein; and a touch element controller for acquiring detection signals from the touch detection electrodes and determining presence of touch in the touch element, wherein the touch element controller includes a receiving unit for receiving the detection signals from the touch detection electrodes and grouping the detection signals into one or more detection signal groups; a memory for storing a detection signal value limit; a signal extracting unit for extracting the maximum detection value out of the detection signal values of the detection for each of the detection signals; a calculating unit for calculating an adjustment variable by deducting the detection signal value limit from the maximum detection signal value for each of the detection groups; and a touch determination unit for determining presence of touch in the touch element, using the adjustment variable.

In a still further aspect, an apparatus for detecting touch includes a display panel for displaying an image; a display panel controller for driving the display panel; a touch element arranged on one surface of the display panel, the touch element comprising a plurality of touch detecting electrodes arranged therein; and a touch element controller for acquiring detection signals from the touch detection electrodes and determining presence of touch in the touch element, wherein the touch element controller includes a receiving unit for receiving the detection signals from the touch detection electrodes and grouping the detection signals into one or more detection signal groups; a memory for storing a detection signal value limit; a signal extracting unit for extracting the maximum detection value out of the detection signal values of the detection for each of the detection signals; a calculating unit for calculating an adjustment variable by deducting the detection signal value limit from the maximum detection signal value for each of the detection groups; and a touch determination unit for determining presence of touch in the touch element, using the adjustment variable.

In a still further aspect, an apparatus for detecting touch includes a touch element comprising a plurality of touch detection electrodes comprising a plurality of first touch detection electrodes and a plurality of second touch detection electrodes; and a touch element controller for applying a driving signal a predetermined number of the second touch detection electrodes and determining presence of touch in the touch element by acquiring detection signals generated by variation of the capacitance generated between the first touch detection electrodes and the second touch detection electrodes, wherein the touch element controller includes a receiving unit for receiving the detection signals from the first touch detection electrodes; a memory for storing a detection signal value limit; a signal extracting unit for extracting the maximum detection signal value out of the detection signal values of the detection signals; a calculating unit for calculating an adjustment variable by deducting the detection signal value from the maximum detection signal value; and a touch determination unit for determining presence of touch in the touch element, using the adjustment variable.

In a still further aspect, an apparatus for detecting touch includes a touch element comprising a plurality of touch detection electrodes comprising a plurality of first touch detection electrodes and a plurality of second touch detection electrodes; and a touch element controller for applying a driving signal a predetermined number of the second touch detection electrodes and determining presence of touch in the touch element by acquiring detection signals generated between the first touch detection electrodes and the second touch detection electrodes, wherein the touch element controller includes a receiving unit for receiving the detection signals from the first touch detection electrodes; a memory for storing a detection signal value limit; a signal extracting unit for extracting the maximum detection signal value out of the detection signal values of the detection signals; a calculating unit for calculating an adjustment variable by deducting the detection signal value from the maximum detection signal value; and a touch determination unit for determining presence of touch in the touch element, using the adjustment variable.

In a still further aspect, a method for detecting touch includes generating detection signals and acquiring the detection signals to be grouped into one or more detection signal groups; extracting the maximum detection signal value out of detection signal values of the detection signals for each of the detection signal groups; calculating an adjustment variable by deducting a detection signal value limit from the maximum detection signal value for each of the detection signal groups; and determining presence of touch in a touch element, using the adjustment variable.

In a still further aspect, a method for detecting touch includes generating detection signals and acquiring the detection signals to be grouped into one or more detection signal groups; extracting the maximum detection signal value out of detection signal values of the detection signals for each of the detection signal groups; calculating an adjustment variable based on a rate of a detection signal value limit to the maximum detection signal value; and determining presence of touch in a touch element, using the adjustment variable.

It is to be understood that both the foregoing general description and the following detailed description are exemplary and explanatory and are intended to provide further explanation of the disclosed subject matter as claimed.

BRIEF DESCRIPTION OF THE DRAWINGS

FIG. 8 is a graph illustrating a relation between a detection signal and a detection signal value;

FIGS. 10, 11, 12 and 13 are graphs to describe driving of a touch detecting apparatus according to exemplary embodiments of the disclosure;

FIGS. 20 and 21 are graphs to describe driving of a touch detecting apparatus according to exemplary embodiments of the disclosure;

BEST MODE

To solve the disadvantages described hereinabove, a touch detecting apparatus according to one embodiment of the disclosure includes a touch element having a plurality of touch detecting electrodes arranged therein and a touch element controller configured to acquire detection signals from the detecting electrodes so as to determine presence of touch on the touch element. The touch element controller includes a receiving unit for receiving the detection signals from the touch detecting electrodes and grouping the detection signals into one or more detection signal groups, a memory for storing a detection signal value limit, a signal extracting unit for extracting the maximum detection signal value from values of the detection signals for each detection signal group, a calculating unit for deducting the detection signal value limit from the maximum detection signal value for each detecting signal group and calculating an adjustment variable, and a touch determination unit for determining presence of touch in the touch element, using the adjustment variable.

DESCRIPTION OF DISCLOSURE

Exemplary embodiments of the disclosed subject matter are described more fully hereinafter with reference to the accompanying drawings. The disclosed subject matter may, however, be embodied in many different forms and should not be construed as limited to the exemplary embodiments set forth herein.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

Hereinafter, embodiments of the disclosure will be described, referring to the accompanying drawings.

Figure 1:
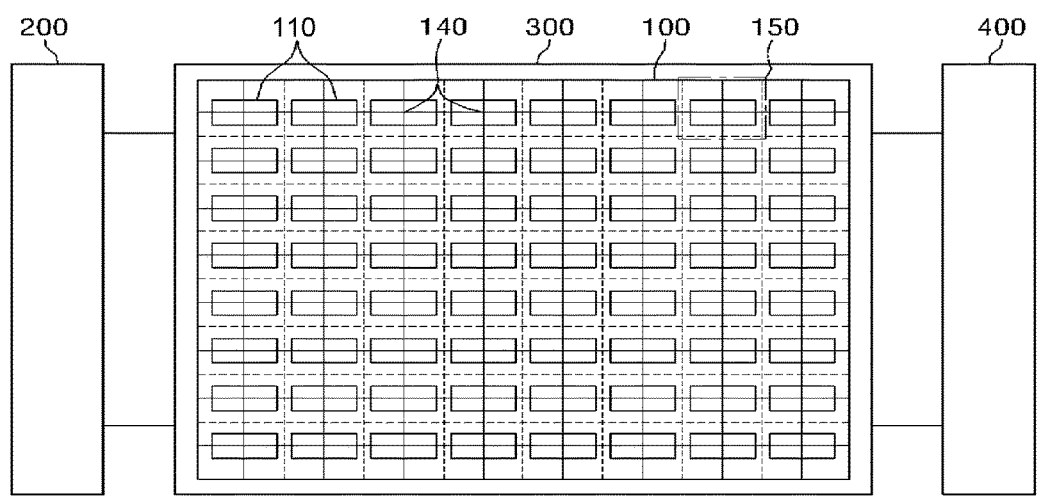
FIG. 1 is a diagram schematically illustrating a touch detecting apparatus according to one embodiment of the disclosure.

FIG. 1 is a diagram schematically illustrating a touch detecting apparatus according to one embodiment of the disclosure. Referring to FIG. 1, the touch detecting apparatus includes a touch element 100 and a touch element controller 200.

The touch element 100 may be a device configured to recognize presence of touch. Examples of the touch element 100 may include a touch screen panel and a touch pad of a notebook. The touch element 100 may include a touch screen. The touch screen may be a surface capable of receiving input of information via touch of an object (e.g., a human body part and a stylus). The touch for inputting information may include not only touch on the touch screen completely but also approaching touch to a touch screen. In some embodiments, the information input by touch can be categorized by a pressure applied to the touch screen and a distance between the object and the touch screen.

The touch element 100 may include a plurality of detecting nodes 140. Each of the detecting nodes 140 may have a coordinate value. The coordinate values of the detecting nodes may be coordinate values corresponding to a coordinate system. For instance, the detecting node 140 may have a matrix alignment corresponding to a rectangular coordinate system and a corresponding coordinate value. A distance between two neighboring detecting nodes 140 may be uniformly fixed.

The number of the detecting nodes 140 may be associated with the number of detecting locations for a detection resolution of the touch element 100. The detection location (or coordinate) is a similar concept to the detection node 140. The detection location (or coordinate) may be used as the same meaning as the detection node 140, unless otherwise noted. From a standpoint of distinguishing the detection location from the detecting node 140, the detecting node 140 may mean a physical location estimated by analysis of the detection signals and the detection location may mean a coordinate seen from a standpoint of recognizing an input of touch data. Accordingly, the detection node 140 may accord with the detection location precisely.

For instance, one detecting node 140 may body forth one detection location (or coordinate). In other words, the detecting nodes 140 may be corresponding to the detection locations one-to-one. In this instance, when a predetermined number (m×n) of detecting nodes are provided, a corresponding number (m×n) of detection locations may be bodied forth and the touch panel may recognize a corresponding number of different touch inputs. Even in this instance, the detection locations are corresponding to the detecting nodes 140 and the locations of the detection locations are not the same as those of the detecting nodes.

In other embodiments, the number of the detecting nodes 140 may be different from the number of the detection locations. For instance, the number of the detecting nodes 140 may be smaller than the number of the detection locations. Two or more signals detected from two or more detecting nodes 140 are integrated to determine one detection location. Alternatively, the number of the detecting nodes 140 may be smaller than the number of the detection location. For instance, a signal value detected from one detecting node 140 is commonly used in determining a plurality of detection locations. Even when determining one detection location, signal values detected from neighboring detecting nodes 140 may be weighted and more detection locations than the number of the detecting nodes 140 may be defined.

Moreover, the detecting node 140 may be a location in the touch element 100 and the detection location is a location in other elements such as a display panel distinguishably. As a typical example, the touch element 100 may be a touch pad of a notebook.

The detecting node 140 may be not a concept of a point. However, under assumption that the detecting nodes are arranged one-to-one corresponding to specific coordinates, the detecting nodes 140 may be understood as a set of discrete points. Touch may be input in a space between the discrete points and a concept of a detecting cell 150 for receiving such touch input as data can be introduced.

The detecting cell 150 may be defined as a virtual space located within a preset uniform distance from the detecting node 140. The space may be a two-dimensional figure, for instance. One detecting node 140 may be arranged in one detecting cell 150.

In case a detecting cell 150 is defined as a two-dimensional figure, a plurality of detecting cells may occupy and divide an overall region of the touch screen. When the detecting nodes 140 are arranged to correspond to a rectangular coordinate system, the detecting cells may be arranged in a matrix array. Each of the detecting cells 150 may have the substantially identical shape and size. Examples of the shape possessed by the detecting cell 150 may include a square, a rectangle, a diamond and the like.

The touch element 100 may include the touch detecting electrodes 110. The touch sensing electrodes may have the substantially identical shape and arrangement and the present embodiment is not limited thereto. Various embodiments can be realized which include a different shape and arrangement of a touch sensing electrodes from the arrangement of the identical detecting cells 150. The shape and arrangement of the touch detecting electrodes will be described in detail later.

The touch element controller 200 may receive a detection signal and calculates the detection signal to determine whether there is touch on the detecting nodes 140. The touch element controller 200 may be formed in an auxiliary printed circuit board, attached or connected to the touch element 100. Alternatively, the touch element controller 200 may be mounted on an insulation substrate for a touch panel, when a touch panel is used as the touch element 100.

The touch detecting apparatus may further include a display device. The display device may include a display panel 300 and a display panel controller 400. The display panel 300 may be a panel for displaying an image. Examples of the display panel include a liquid crystal display (LCD) panel, an electrophoretic display panel, an organic light emitting diode (OLED) panel, a light emitting diode (LED) panel, an inorganic electro luminescent display (EL) panel, a field emission display (FED) panel, a surface-conduction electron-emitter display (SED) panel, a plasma display panel (PDP), a cathode ray tube (CRT) panel. When a touch panel is used as the touch element 100, a touch panel may be disposed on a surface of the display panel 300. When a touch pad is used as the touch element 100, a touch pad may be electrically connected to the display panel 300 via a signal wire.

The display panel controller 400 may provide the display panel 300 with a signal for displaying an image. The display panel controller 400 may be formed on an auxiliary printed circuit board to be attached to the display panel 300. Alternatively, the display panel controller 400 may be arranged on an insulation substrate for the display panel 300.

The touch element controller 200 and the display panel controller 400 may be configured of exclusive modules, respectively. However, in some embodiments, the touch element controller 200 may be formed integrated with the display panel controller 400. In one embodiment, both of the touch element controller 200 and the display panel controller 400 may be formed on an insulation substrate for a display panel.

Hereinafter, a touch element according to exemplary embodiments will be described in detail. For explanation sake, a capacitive overlay touch element is adopted and it is obvious to adopt an analog resistive type, a surface acoustic wave type and an infrared type touch element to the description of the embodiments.

A touch element according to exemplary embodiments of the disclosure may use a method for determining touch input, using self-capacitance generated between a touching object and a detection electrode, without applying an auxiliary driving signal. Also, the touch element may use a method for applying a preset driving signal and determining touch input, using a mutual-capacitance generated between a plurality of detection electrodes by a touching object.

FIGS. 2, 3, 4 and 5 are plane views of the touch element according to exemplary embodiments of the disclosure. The embodiments shown in FIGS. 2, 3, 4 and 5 show a touch panel 101a, 101b, 101c and 101d as the touch element 100.

Referring to FIGS. 2, 3, 4 and 5, the touch panel 101a~101d includes an insulation substrate and a touch detection electrode 110a~110d formed on the insulation substrate. The insulation substrate may be a transparent insulation substrate. Examples of the insulation substrate may include a transparent plastic substrate, a transparent glass substrate, a transparent quartz substrate. Moreover, the insulation substrate may be a flexible substrate and it is preferred that the insulation substrate is formed of hard plastic combined with one or more plastic materials (e.g., tempered glass, poly methyl methacrylate (PMMMA), PC and PET).

A plurality of touch detection electrodes 110a~110d may be formed on the insulation substrate. The touch detection electrodes 110a~110d may be formed of a transparent conductive material. Examples of applicable transparent conductive material may include oxide (e.g., indium tin oxide (ITO), indium zinc oxide (IZO) and zinc oxide (ZO)), carbon nanotube, metallic nanowire and conductive polymer. Metallic mesh with thin metallic wires formed in a mesh shape is patterned to form a detection electrode.

The touch detection electrodes 110a~110d may be formed in various patterns and arranged in various shapes.

Figure 2:
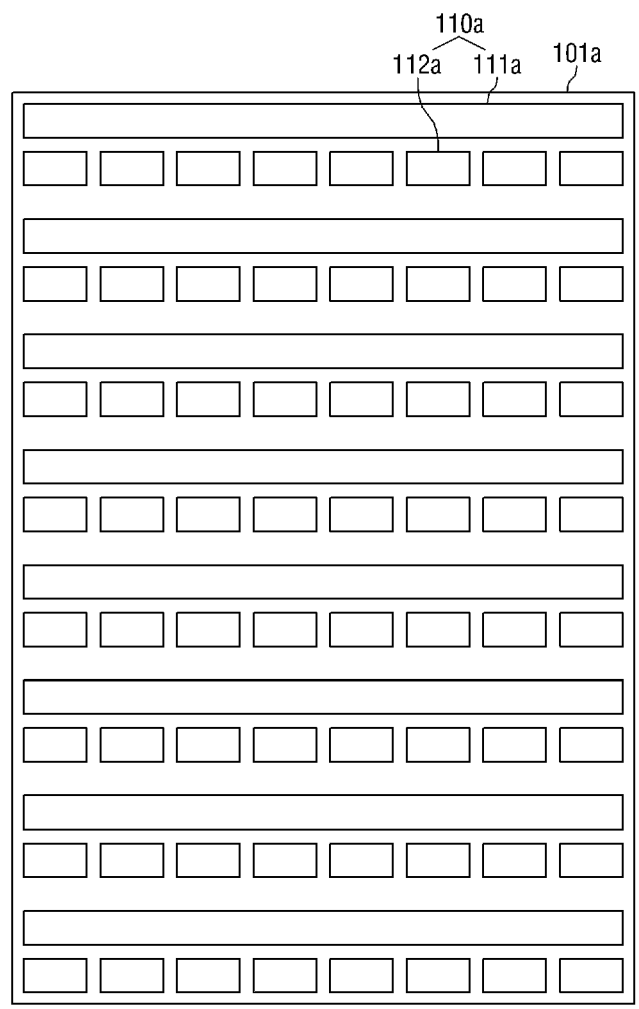
FIGS. 2, 3, 4 and 5 are diagrams of a touch panel according to exemplary embodiments of the disclosure.

In one embodiment, a touch detection electrode 110a shown in FIG. 2 may include a first touch detection electrode 111a and a second touch detection electrode 112a which are formed in a different shape. The first touch detection electrode 111a has a line pattern extended in a first direction (a horizontal direction in the drawing). The second touch detection electrode 112a has an island pattern formed in a rectangular shape.

Rows having the first touch detection electrode 111a and the second touch detection electrode 112a may be arranged along a second direction (a vertical direction in the drawing) alternatively. For instance, when the first touch detection electrode 111a is arranged in the nth row, a plurality of second touch detection electrodes 112a may be arranged in the (n+1)th row. The first touch detection electrode 111a and the second touch detection electrode 112a may be arranged on the same layer on the substrate. Although not shown in the drawings, a plurality of connection electrodes may be arranged on the substrate. Each of the connection electrodes may be connected to each of the second touch detection electrodes 112a. Each of the connection electrodes may be connected to a wiring unit (not shown) formed outside the island patterns arranged in the same location on a first axis.

When the touch panel 101a is driven as a self-capacitive overlay touch element, the first touch detection electrode 111a may detect a location (or coordinate) of a touch node in the second direction (the vertical direction in the drawings) and the second touch detection electrode 112a may detect a location (or coordinate) of a touch node in the first direction.

When driven as a mutual-capacitive overlay touch element, the touch panel 101a applies a driving signal to at least one of the second touch detection electrodes 112a from the arranged mentioned above and receives a detection signal generated between the first touch detection electrode 111a and the second touch detection electrode 112a, in other words, variation of a mutual-capacitance generated between the first touch detection electrode 111a and the second touch detection electrode 112a, only to detect a location (or coordinate) of a touch node.

A more detailed and exemplary description of the touch panel according to the embodiment of FIG. 2 is disclosed in Korean Patent No. 10-0885730. Detailed description of the disclosure is integrated as mentioned above.

Figure 3:
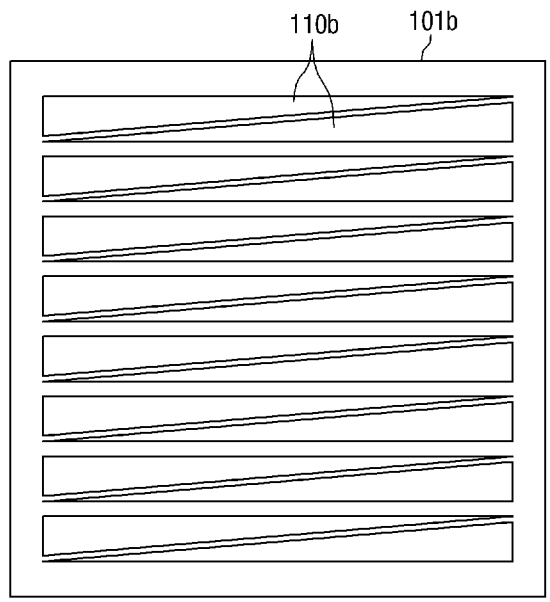

In some embodiments, a touch detection electrode 110b shown in FIG. 3 may have a triangle pattern extended in a first direction (a horizontal direction in the drawing). The triangle may be a right-angled triangle or an isosceles triangle, not limited thereto.

When the shortest side out of three sides possessed by the triangle is the bottom side a triangle pattern of a touch detection electrode 110b located in the nth row has the bottom side located in a predetermined region (a left region in the drawing). A triangle pattern located in the nth row and a triangle pattern located in the (n+1)th row may be in point symmetry, with the substantially identical shape.

When a user inputs touch to the touch panel 110b shown in FIG. 3, a location of a touch node can be detected, using a size of a detection signal value in a touch detection electrode 110b in which touch is sensed out of the touch detection electrodes 110b.

A more detailed and exemplary structure of the touch panel according to the embodiment of FIG. 3 is disclosed in Korean Patent No. 10-2010-0032283. The detailed description disclosed in the patent application is quoted and integrated as mentioned above.

Figure 4:
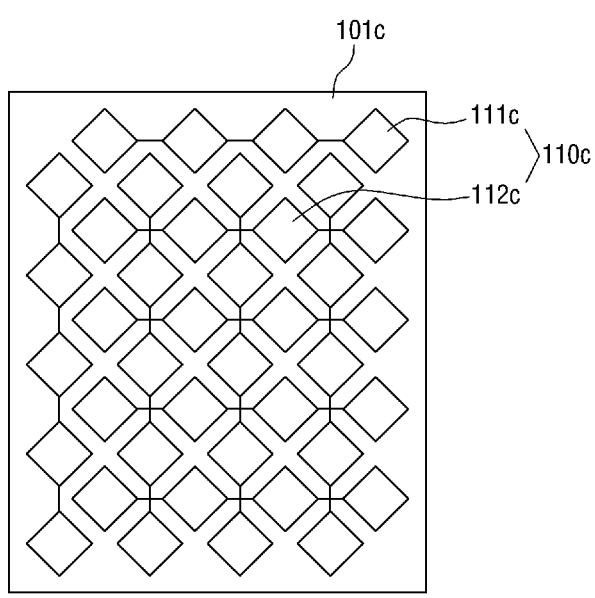

An embodiment of FIG. 4 shows that the touch detection electrode 110 is formed in a diamond shape. A touch detection electrode 110c include a first touch detection electrode configured of a plurality of diamond-shaped unit electrodes arranged in a first direction (a horizontal direction in the drawing) electrically connected with each other by a first connection electrode; and a second touch detection electrode 112d configured of a plurality of diamond-shaped unit electrodes arranged in the second direction (a vertical direction in the drawing) and electrically connected with each other by a second connection electrode.

When the touch panel 101c is driven as a self-capacitive overlay touch element, the first touch detection electrode 1111c may detect a location (or coordinate) of a touch node in a second direction from the arrangement mentioned above and a second touch detection electrode 112c may detect a location (or a coordinate) of a touch in a first direction from the arrangement.

When driven as a mutual-capacitive overlay touch element, the touch panel 101c applies a driving signal to at least some of the second touch detection electrodes 112c and receive a detection signal generated between the first touch detection electrode 111c and the second touch detection electrode 112c, in other words, variation of a mutual-capacitance generated between the first touch detection electrode 111 and the second touch detection electrode 112c from the first touch detection electrode 111c, only to detect a location of (or coordinate) of a touch node.

A more detailed and exemplary structure of the embodiment shown in FIG. 4 is disclosed in Korean Patent No. 10-2010-0032283. Detailed description disclosed in the patent application is quoted and integrated as mentioned in the present disclosure.

Figure 5:
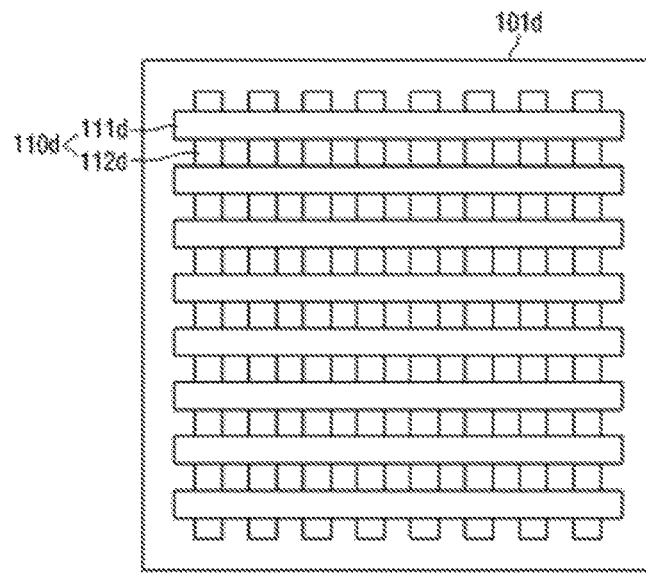

FIG. 5 shows that a layer having first touch detection electrodes 111d and a layer having second touch detection electrodes 112d are different from each other to arrange the first touch detection electrodes and the second touch detection electrodes alternatively. The first touch detection electrode has a line pattern extended along a first direction (a horizontal direction in the drawing) and the second touch detection electrode 112d has a line pattern extended along a second direction (a vertical direction in the drawing). An insulation layer (not shown) or an insulation substrate (not shown) may be disposed between the first touch detection electrodes 111d and the second touch detection electrodes 112d.

When the touch panel 101d is driven as the self-capacitive overlay touch element, the first touch detection electrode 111d may detect a location of a touch node (or coordinate) in the second direction and the second touch detection electrode 112d may detect a location (or coordinate) of a touch node in the first direction from the arranged mentioned above.

Also, when the touch panel 101d is driven as the mutual-capacitive overlay touch element, a driving signal is applied to some of the second touch detection electrodes 112d from the arrangement mentioned above and a detection signal generated between the first touch detection electrode 111d and the second touch detection electrode 112d, in other words, variation of mutual-capacitance generated between the first touch detection electrode 111d and the second touch detection electrode 112d may be received from the first touch detection electrode 111d, such that a location (or coordinate) of a touch node can be detected.

Figure 6:
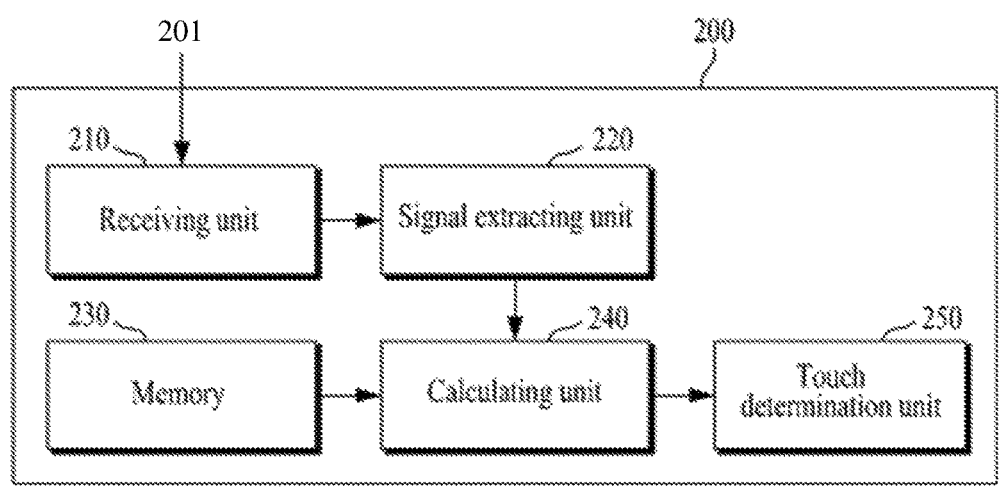
FIG. 6 is a block diagram of a touch panel control unit according to one embodiment of the disclosure.

The touch element controller shown in FIG. 1 will be described in detail and FIG. 6 is a block diagram of the touch element controller according to one embodiment of the disclosure.

Referring to FIG. 6, the touch element controller 200 may acquire the detection signal 201 from the detection electrodes arranged in the touch element 100 and determine presence of touch on the touch element 100. The touch element controller 200 may include a receiving unit 210, a signal extracting unit 220, a memory 230, a calculating unit 240 and a touch determination unit 250.

The receiving unit 210 receives the detection signal from the touch detection electrode 110 arranged in the touch element 100. When the user applies a touch input to the touch element 100, each of the touch detection electrodes 110 acquires a different detection signal based on a touch level or a touch area. In case the touch element 100 is the capacitive overlay type, a detection signal value reflects variation of capacitance generated by touch. For instance, in case the touch element 100 is the self-capacitive type, a detection signal value reflects variation of the capacitance generated between a touch object and the touch detection electrode 110. In case the touch element 100 is the mutual-capacitive type, a detection signal value reflects variation of the capacitance generated between the first touch detection electrode 111 and the second touch detection electrode 112.

The receiving unit 210 may output the detection signals as independent signals or group and output them into one or more groups. When it groups the detection signals into one or more groups to output, the receiving unit 210 may group the detection signals into one group to output. Alternatively, the receiving unit 210 may receive detection signals associated with coordinates in a direction of a line direction into a first group and detection signals associated with a column direction into a second group, to output.

The process of transferring the detection signal value acquired in the touch detection electrode to the receiving unit 210 via a wire will be described. In FIG. 6, the receiving unit 210 is shown as an independent element from the touch element controller and it may be integrated with the signal extracting unit 220 which will be described later.

The signal extracting unit 220 extracts the maximum detection signal value from the values of the detection signals, when receiving the detection signals as independent signals. When receiving one or more groups of detection signals from the receiving unit 210, the signal extracting unit 220 extracts the maximum detection signal value from the values of the detection signals which belongs to each group. When receiving two or more groups from the receiving unit 210, the signal extracting unit 220 may extract two or more maximum detection signal values.

Each of the detection signals may have a different detection signal value in accordance with a touch level or a touch area. In other words, the size of the capacitance in accordance with touch is proportional directly to a touch area and inversely to a touch distance. When the user's touch level is high, the detection signal value is large. When the user touch level is low, the value is small. When the user's touch area is wide, the detection signal value is large. When the user's touch area is narrow, the detection signal value is small. Accordingly, the maximum detection signal value may mean the detection signal value acquired from the touch detection electrode receiving the highest user touch level or the widest user touch area.

The memory 230 may a storage element configured to store arbitrary data. A detection signal value limit and/or a detection signal critical value may be stored in the memory 230.

Figure 9:
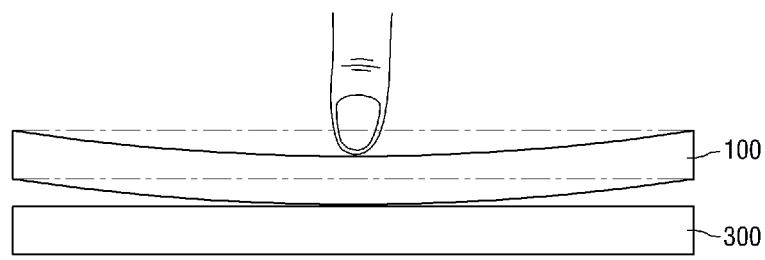
FIG. 9 is a diagram schematically illustrating touch of a rear surface.

The detection signal value limit may means the maximum detection signal value which can be detected by touch in a normal state. Referring to FIG. 9, detailed description thereof will be disclosed. FIG. 9 is a diagram schematically illustrating a rear noise. In FIG. 9, a touch panel is arranged on one surface of a display panel 300. The display panel 300 and the touch panel may be spaced apart a predetermined distance from each other, as shown in FIG. 9. When the user applies a touch pressure to the touch panel, the touch panel can bend toward the display panel 300 by the pressure of the touch. When a level of the user touch input is increased, the bending strength of the touch panel can be increased. The touch panel is bending and a distance to the display panel 300 is reduced. Meanwhile, the display panel 300 includes a conductive material configured to be used for a pixel electrode, a gate wire and the like. A distance between the conductive material and the touch panel is also reduced. When the distance between the conductive material of the display panel 300 and the touch detection electrode is reduced to a value limit or less, an effective capacitance is formed there between. Such phenomenon may be similar to the effect of the touch input by the conductive material used as a touch object in a rear surface, which can be referred to as "rear surface touch".

As the distance to the display panel 300 is reduced more and more, the size of the capacitance generated by the rear surface touch may be getting increased more and more. The capacitance generated by the rear surface touch may be mixed with the capacitance generated by the touch input, to create a larger signal value. Variation of the signal value caused by the rear surface touch may acts as noise. The maximum value of the detection signal values calculated in a normal state with no noise factors may be defined as the detection signal value limit.

The detection signal critical value may mean the minim detection signal value which is used as a standard for determining whether there is a touch input. The calculation unit 240 may receive the detection signal value for each group and the maximum detection signal value from the signal extracting unit 220. In addition, the calculating The values of the detection signals for each detection signal value group and an adjustment variable are calculated, to generate an adjustment detection signal value. The calculation may include subtraction. The adjustment variable may be a value gained by deducting the detection value limit from the maximum detection signal value and it may mean the maximum noise value generated by the rear surface touch. As the maximum detection signal value is the same as or smaller than the detection signal value limit, the adjustment variable is calculated as zero and the adjustment detection signal value may be substantially identical to the detection signal value input to the calculation unit 240.

The touch determination unit 250 may receive an input of the adjustment detection signal value and the detection signal critical value to determine presence of touch on the touch element 100. The detection signal critical value may be transferred from the calculating unit 240 or it may be directly input from the memory 230. The touch determination unit 250 compares the input adjustment detection signal value and the detection signal critical value and determines presence of touch based on the result of the comparison. When the adjustment detection signal value is the same as or larger than the detection signal critical value, it may be determined that there is touch. When two or more adjustment detection signal value is the same as or larger than the detection signal critical value, it may be determined that there are two or more touch inputs. Even when the two or more touch locations are close to each other or spaced apart a predetermined distance from each other, it is possible to determine presence of touch. The touch determination unit 250 may detect a touch coordinate from the detection signal value for each group determined to have touch input and outputs the result of the detection, to provide the output result to a touch input treating apparatus not shown in the drawings.

The calculating unit 240 may be provided with an independent detection signal value and the maximum detection signal value from the signal extracting unit 220. Also, it may be provided the detection signal value limit from the memory 230. The calculating unit 240 deducts the detection signal value limit from the maximum detection signal value and calculates an adjustment variable, using the gained value after deduction. When the maximum detection signal value is the same as or smaller than the detection signal value limit, the adjustment variable may be calculated as zero. When the maximum detection signal value is larger than the detection signal value limit, the adjustment variable may be calculated as a number not zero.

Hence, each detection signal value and adjustment variable of the detection signals are calculated to generate an adjustment detection signal value. The calculation may include subtraction. The adjustment variable may be a value gained by deducting the detection signal value limit from the maximum detection signal value and it may mean the maximum noise value generated by the rear surface touch. When the maximum detection signal value is the same as or smaller than the detection signal value, the adjustment variable is calculated as zero and the adjustment detection signal value may be the same as or substantially identical to the detection signal value input to the calculating unit 240.

The touch determination unit 250 may receive an input of the adjustment detection signal value and the detection signal critical value to determine presence of touch on the touch element 100. The detection signal critical value may be transferred from the calculating unit 240 or it may be directly input from the memory 230. The touch determination unit 250 compares the input adjustment detection signal value and the detection signal critical value and determines presence of touch based on the result of the comparison. When the adjustment detection signal value is the same as or larger than the detection signal critical value, it may be determined that there is touch. When two or more adjustment detection signal value is the same as or larger than the detection signal critical value, it may be determined that there are two or more touch inputs. Even when the two or more touch locations are close to each other or spaced apart a predetermined distance from each other, it is possible to determine presence of touch. The touch determination unit 250 may detect a touch coordinate from the detection signal value for each group determined to have touch input and outputs the result of the detection, to provide the output result to a touch input treating apparatus not shown in the drawings.

Hereinafter, referring to FIGS. 7 through 13, a detailed operation of the touch element controller will be described. For easy understandable description, the touch element controller shown in FIGS. 7 through 13 may drive the self-capacitive overlay touch element.

Figure 7:
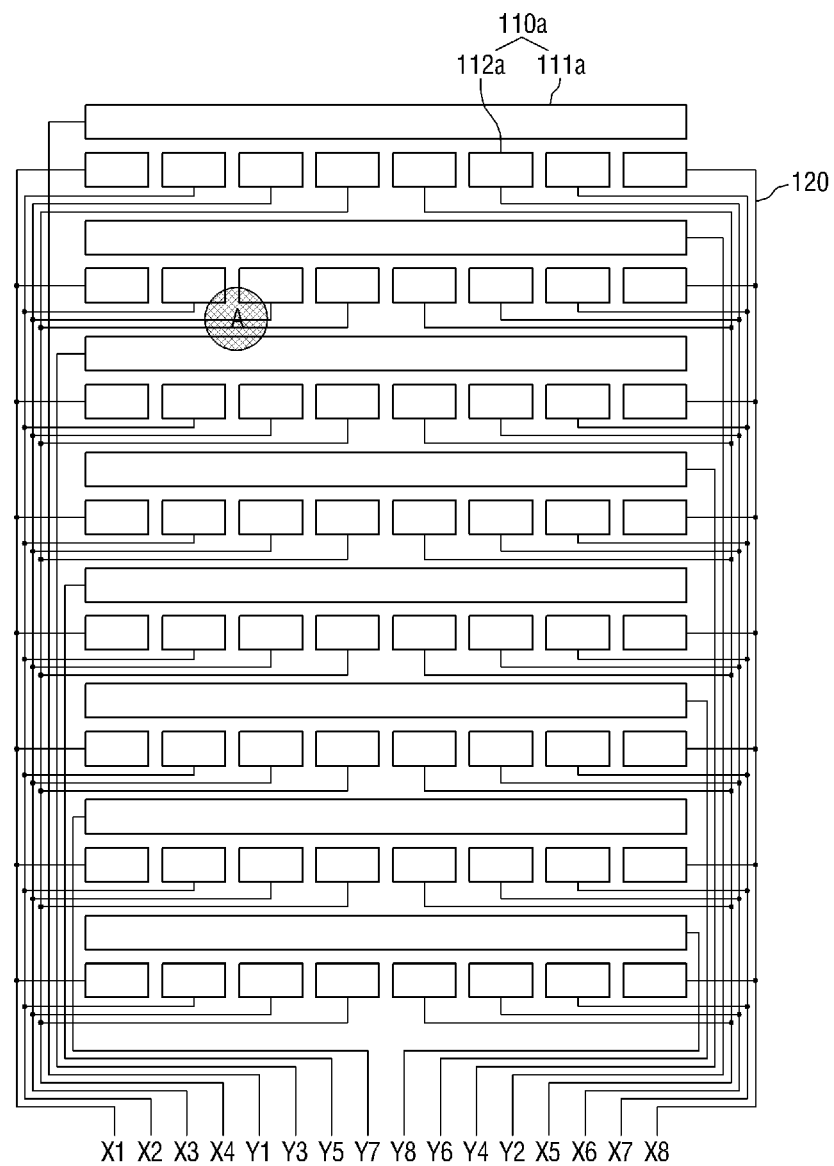
FIG. 7 is a plane view of a touch panel according to one embodiment of the disclosure.

FIG. 7 is a plane view of a touch panel according to one embodiment of the disclosure. FIG. 8 is a graph illustrating a relation between a detection signal and a detection signal value. FIG. 7 shows one embodiment realizing the touch element shown in FIG. 2. The touch element realized in FIGS. 3, 4 and 5 or other type touch elements may be applicable.

FIG. 7 shows that 8 first touch detection electrodes 111a are arranged in parallel. Second touch detection electrodes 112a form 8 lines and 8 second touch detection electrodes 112a are arranged in one line. In FIG. 7, a touch region having the user's touch input is shown as "A".

When touch is input to the touch element, the detection signal value acquired from the touch detection electrode is transferred to the receiving unit 210 of the touch element controller 200 via a wire 120. Each of the 8 first touch detection electrodes 111a is linked to each of wires (Y1 through Y8), to transfer each of the detection signals (y1 through y8) to the receiving unit 210. The wire connected from second touch detection electrodes 112a arranged in the same column out of the second touch detection electrodes 112a arranged in each line may be connected to one wire (X1 through X8), to transfer each of the detection signals (x1 through x8) to the receiving unit 210. For instance, a wire from one second touch detection electrode 112a located in the leftmost column out of the second touch detection electrodes 112 may be connected to one wire (X1) and transfers a detection signal (x1) to the receiving unit 210. In the receiving unit 210, the detection signals (y1 through y8) input from wires (Y1 through Y8) may be grouped into a first detection signal group and the detection signals (x1 through x8) input from wires (X1 through X8) may be grouped into a second detection signal group. Hereinafter, the groups will be described.

FIG. 8 is a graph illustrating a relation between a detection signal and a detection signal value. The graph of FIG. 8 shows a relation between a detection signal and a detection signal value, in case there is a touch input to the touch region of FIG. 7.

In a graph of FIG. 8 (a), X-axis refers to the detection signals (x1 through x8) grouped into the second detection signal group and Y-axis refers to the detection signal value. The detection signal value may mean the size of the detection signal. As the capacitance generated by touch is getting larger, in other words, the touch input detected from the touch detection electrode 110 is getting larger, the detection signal value is getting larger.

In a graph of FIG. 8 (b), X-axis refers to the detection signals (y1 through y8) grouped into the first detection signal group and Y-axis refers the detection signal value.

As mentioned above, the detection signal critical value means the minimum detection signal value which is a standard for determining presence of touch input. When the size of the detection signals detected from any touch detection electrodes is larger than the detection signal critical value, it may be determined that there is the user's touch input to a corresponding touch detection electrode 110a.

For instance, it is assumed that touch input be applied to A region of the touch element shown in FIG. 7. In this instance, the touch region may be overlapped with the touch detection electrodes 112a arranged in the second and third columns from the leftmost out of the second touch detection electrodes located in the second line. Accordingly, the detection signal values of the detection signals (x2 and x3) received from the second touch detection electrodes 112a located in the second and third columns shown in the graph of FIG. 8 (a) out of the detection signals of the second detection signal group transferred to the receiving unit 210 may be larger than the detection signal critical value. In this embodiment, the maximum signal value in the second detection signal group applied to the second touch detection electrodes 112a is detected from the wire (X3) and a value (x3) of the maximum detection signal may be smaller than the detection signal value limit.

An actual touch region is overlapped with the second touch detection electrodes 112a located in the second and third lines. However, a predetermined detection signal value may be generated in a neighboring electrode except a corresponding touch detection electrode by a capacitance with a touch object or a mutual capacitance with a touched detection electrode. In this instance, direct touch input is not applied and the detection signal value may be smaller than the detection signal critical value. In the graph shown in FIG. 8 (a), detection signal values of the detection signals (x1, x4 and x5) transferred from second touch detection electrodes 112a located in the first, fourth and fifth columns is larger than zero and smaller than the detection signal critical value.

A touch region for the first touch detection electrode 11a may be overlapped with the third line. As shown in a graph of FIG. 8 (b), a detection signal value of the detection signal (y3) transferred from the first touch detection electrodes 111a located in the third line out of the first detection signal group (y1 through y8) is larger than a detection signal critical value in the same method. Detection signals (y1, y2, y3, y4 and y5) transmitted from the first touch detection electrodes 111a located in the first, second fourth and fifth lines which are neighboring electrodes are larger than zero and smaller than a detection signal critical value. In this embodiment, a detection signal value of the detection signal (y3) which is the maximum detections signal value in the first detection signal group is smaller than the detection signal value limit.

The maximum detection signal value in the second detection signal group (x1 through x8) and the first detection signal group (y1 through y8) is extracted by the signal extracting unit 220 and input to the calculating unit 240. The calculating unit 240 calculates an adjustment variable for each signal group. As mentioned above, the maximum detection signal value of each detection signal group is smaller than the detection signal value limit and the calculated adjustment variable may be zero. Accordingly, the calculating unit 240 output the adjustment detection signal value which is the same as or substantially identical to the detection signal values output from the signal extracting unit 220 to the touch determination unit 250. The touch determination unit 250 compares the adjustment detection signal value with the detection signal critical value and determines that there are touch inputs in the touch detection electrodes 110a connected to wires (X2, X3 and Y3) for transferring the detection signals (x2, x3 and y3) based on the result of the comparison, such that a coordinate of the touch area can be detected and the result of the detection can be output.

FIG. 10 is a graph showing a relation between a detection signal and a detection signal value in case noise is generated.

FIG. 10 is the same as FIG. 8, except that a noise value generated by the rear surface touch is added to the detection signal value of FIG. 8.

Referring to FIG. 9, when the user applies a touch input to the touch element 100, together with a predetermined pressure, the touch element 100 may bend. In this instance, a bending degree of the touch element 100 is the highest in a region having an actual touch input. The farther is from the region having the actual touch input, the more the bending degree of the touch element is reduced. Accordingly, the noise generated by the rear surface touch is the largest in the region where actual rear surface touch is applied and it is getting smaller as getting farther from the region having the rear surface touch.

Referring to a graph of FIG. 10 (a), it can be identified that the noise generated by the rear surface touch is added to each detection signal value of the second detection signal group. Under the assumption that the actual touch input region is the second touch detection electrodes 112a located in the third column, a noise value of x3 is the largest and the noise value is getting reduced more and more, as farther from the second touch detection electrodes 112a located in the third column as shown in the graph of FIG. 10 (a).

Referring to a graph of FIG. 10 (b), it can be identified that the noise generated by the rear surface touch is added to each detection signal value in the first detection signal group. Under the assumption that the actual touch input region is the first touch detection electrodes 111a located in the third line, a noise value of y3 shown in a graph of FIG. 10 (b) is the largest and the noise value is reduced more and more as getting farther from the first touch detection electrode 111a located in the third lin.

The maximum detection signal values in the second detection signal group and the first detection signal group may be extracted by the signal extracting signal 220 and input to the calculating unit 240. As mentioned above, the maximum detection signal value for each of the detection signal groups include noise.

The calculating unit 240 extracts an adjustment variable, using a value gained by deducting the detection signal value from the maximum detection signal value for each signal group. For instance, the adjustment variable may be a value gained by subtracting the detection signal value from the maximum detection signal value.

In the graph of FIG. 10 (a) showing the second detection signal group, x3 is the maximum detection signal value and the adjustment variable of the second detection signal group can be acquired, using the value gained by deducting the detection signal value limit from the detection signal value of x3 and an adjustment variable of the first detection signal group is acquired, using a value gained by deducting the detection signal value limit from the detection signal value of y3.

An adjustment factor of each detection signal group is used in calculating the adjustment detection signal value after adjusting the detection signal value in each detection signal group. In a graph of FIG. 10, a wire (X4) and wires (Y2 and Y4) has a larger detection signal value than a detection signal critical value, because of the noise generated by the rear surface touch, although there is no touch input to the detection electrodes connected thereto. However, while the adjustment detection signal value is calculated, using the adjustment variable, the size of the signal value may be getting reduced to be less than the detection critical value. Accordingly, the touch determination unit 250 may exclude the electrodes corresponding to the wire (X4) and the wires (Y2 and Y4) from the touch region, only to prevent errors of the touch detection apparatus caused by the noise and to improve the accuracy of the touch detection.

Next, referring to FIGS. 11, 12 and 13, a method of calculating the adjustment detection signal value performed by the calculating unit 240 according to exemplary embodiments will be described in detail.

FIG. 11 is a graph showing a relation between the adjustment detection signal value generated by the calculating unit 240 and the detection signal according to the embodiments. FIG. 11 shows the result of the adjustment detection signal value calculated, using a corresponding adjustment factor for each of the detection signal values in a corresponding group of FIG. 10.

In the present embodiment, an adjustment detection signal value is gained as a method for deducting an adjustment variable of each group from the adjustment signal value. Here, the adjustment variable may be a value gained by deducting the detection signal value limit from the maximum detection signal value.

In the embodiment of FIG. 11, an adjustment variable is deducted from the detection signals (x3 and y3) showing the maximum detection signal value and the adjustment detection signal value which is the same as the detection signal value limit may be calculated.

Meanwhile, the detection signal (x4, y2 and y4) larger than the detection signal critical value as the detection signal values are getting larger by noise may have a smaller size, because the adjustment variable is deducted. As mentioned above, when noise has the largest value in the detection signal (x3 and y3), it is likely that the adjustment variable gained by deducting the detection signal value limit from the detection signal value of the detection signal (x3 and y3) larger than the noise applied to the other detection signals. Accordingly, the deduction of the adjustment variable from the detection signal value of the detection signal (x4, y2 and y4) may mean deduction of a value which is the same as or larger than the noise of the detection signal x4, y2 and y4, such that the adjustment detection signal value of the detection signal (x2, y2 and y4) may be smaller than the detection signal critical value.

Accordingly, the touch determination unit 250 determines that there is no touch input to a corresponding electrode of the detection signal (x4, y2 and y4) which is smaller than the detection signal critical value, only to exclude an error of the touch detecting apparatus for noise.

As a modified embodiment, the adjustment detection signal value maybe gained by deducting a specific constant, not the adjustment variable, from the detection signal. Here, the adjustment variable maybe used in determining whether to deduct the specific constant. For instance, when the adjustment variable is zero, a specific constant is not deducted. When the adjustment variable is larger than zero, it is configurated to deduct a specific constant.

The specific constant may be determined, regardless of the size of the adjustment variable. The deduction of the specific constant may be performed in manners of deducting the same constant from all of the detection signal values or deducting a constant proportional to the detection signal value. Alternatively, the specific constant may be pre-stored and used as a lookup table.

FIG. 12 is a graph showing a relation between a detection signal and an adjustment signal value generated by a calculating unit 240 according to another embodiment of the disclosure. FIG. 12 shows the result of calculation for an adjustment detection signal value, using a corresponding adjustment factor of each of the detection signals in a corresponding group shown in FIG. 10.

In the present embodiment, an adjustment detection signal value may be gained by deducting the product of the adjustment variable in each group and the adjustment factor from the detection signal value in a lump sum.

As mentioned above, the noise generated by the rear surface touch is the largest in the region having the actual rear surface touch and getting smaller, as farther from the region having the rear surface touch. Referring to FIG. 10, a value of the noise generated by the rear surface touch is the largest in a detection signal (x3 and y3) corresponding to a wire (X3 and Y3) and the noise of the corresponding detection signal is reduced more and more, as farther from the wire (X3 and Y3). Accordingly, the adjustment factor for reflecting noise distribution is used so as to adjust the adjustment detection signal value minutely.

The adjustment factor may be defined different for each of the detection signals. A large value of an adjustment factor may be defined for the detection signal value from the touch detection electrode 110a receiving the rear surface touch. A relatively small value may be defined for the detection signal value from the touch detection electrode 110a receiving no rear surface touch. For instance, the adjustment factor has the maximum value for the detection signal having the maximum detection signal and the size of the adjustment factor may be reduced based on a distance from the touch detection electrode 110a detecting the detection signal having the maximum detection signal value. The adjustment factor may be set in accordance with a relative quantity of noise, based on noise distribution caused by the rear surface touch. In some embodiments, the adjustment factor may be 0 or more or 1 or less.

The adjustment factor may be pre-stored in the memory 230 as a look up table (LUT). A detection signal value limit for the touch element 100 may be pre-calculated when the touch element 100 is designed. Variation of noise distribution according to variation of the side of the maximum detection signal value may be also pre-calculated experimentally. Accordingly, when manufacturing the touch detection apparatus, an adjustment factor for the maximum detection signal value may be pre-stored in the memory as a look up table.

The adjustment variation and/or adjustment factor mentioned above may be defined different from each of the group of the touch detection electrodes 110a. For instance, as shown in FIG. 7, a touch region (A) is overlapped with the second touch detection electrodes 112a located in the second and third column from the leftmost out of the second touch detection electrodes 112a located in the second line and also overlapped with a wire (X4) transferring a detection signal value from the second touch detection electrodes 112a located in the fourth column, with no actual touch. Accordingly, noise is added even to a wire (X4) and it is determined that there is the user touch input even in the second touch detection electrode 112a of the fourth column, with no actual touch input. The noise generation probability may be varied by the structure of the electrode. Touch detection electrodes with a similar noise generation probability is grouped and an individual weight is provided to each of the groups and reflected in the adjustment variable and/or the adjustment factor, such that adaptability to diverse noise environments can be enhanced.

FIG. 13 is a graph showing a relation between a detection signal and a detection signal value calculated by a calculating unit 20 according to embodiments. Referring to FIG. 13, a calculating unit 240 according to embodiments of the disclosure may not calculate the detection signal value, using the adjustment variable. Instead, the calculating unit 240 may calculate (e.g., add) an adjustment variable, using a detection signal critical value and generate an adjustment detection signal, to determine presence of touch in the touch element, using the adjustment detection signal critical value. In FIG. 13, a detection signal value of x2, x3 and y3 is a larger than a detection signal critical value. A detection signal value of x4, y2 and y4 is larger than a detection signal critical value. However, by a standard of the adjustment detection signal critical value generated by adding the adjustment variable to the detection signal critical value, a detection signal value of x2, x3 and y3 is large and a detection signal value of x4, y2 and y4 is small. Accordingly, a touch determination unit 250 compares the detection signal value with the adjustment detection signal critical value, to determine presence of touch. Accordingly, the detection signal (4x, y2 and y4) corresponding to noise can be excluded.

The adjustment variable applied in this embodiment may be calculated, using a method substantially identical to the methods mentioned, referring to FIGS. 11 and 12.

Although not shown in the drawings, a touch detecting apparatus according to a still further embodiment may determine the number of touches in a touch element, using a detection signal; calculate a normal detection rate based on the number of the touches; generate an adjustment detection signal value, using an adjustment variable; calculate a rate of detection signal values larger than a detection signal critical value out of the adjustment detection signal; and compare the calculated rate with a normal rate to determine whether to perform re-adjustment.

In a state where noise is removed or in a normal state with no noise, the number of detection signal values larger than the detection signal critical value is not larger than a specific number out of the detection signal values detected by touch detection electrodes of the touch element. For instance, the specific number may be the number of initially input touches. To determine whether the noise is removed completely, the number of the touches in the touch element is determined, using the initially input detection signal, and the normal detection rate may be calculated based on the number of touches. The normal detection rate may mean a rate of the detection signal values over the detection signal critical value of the total detection signal values which can be generated, corresponding to the number of the corresponding touches. For instance, when one touch is input to the touch element having a preset size, a rate of the detection signal values over the detection signal critical value out of the total detection signal values is 5% and the number of the touches determined, using the initially input detection signal is 3. At this time, a normal detection rate may be 15%.

After calculating the normal detection rate, a rate of the detection signal values over the detection signal critical value out of the adjusted detection signal values may be calculated and the calculated rate may be compared with the normal detection rate, such that it can be determined whether noise is removed completely based on the result of the comparison. Unless the noise is removed completely, in other words, the rate of the detection signal values over the detection signal critical value out of the adjusted detection signal values is higher than the normal detection rate, re-adjustment may be performed. The re-adjustment may be performed according to diverse methods for removing noise.

Although not shown in the drawings, a touch detecting apparatus according to a still further embodiment may generate an adjustment detection signal value, using an adjustment variable. When there is an adjustment detection signal value lower than a specific rate of the detection signal value limit out of the adjustment detection signal, the adjustment detection signal value lower than the specific rate of the detection signal value limits may be re-adjusted as zero. In some embodiments, a specific rate of the detection signal value limits may be approximately 5% of the detection signal value.

Hereinafter, referring to FIGS. 14 through 18, a detailed operation of the touch element controller will be described in detail. For easy understanding of description, it is assumed that the touch element controller shown in FIGS. 7 through 10 may drive a mutual-capacitive overlay touch element.

Figure 14:
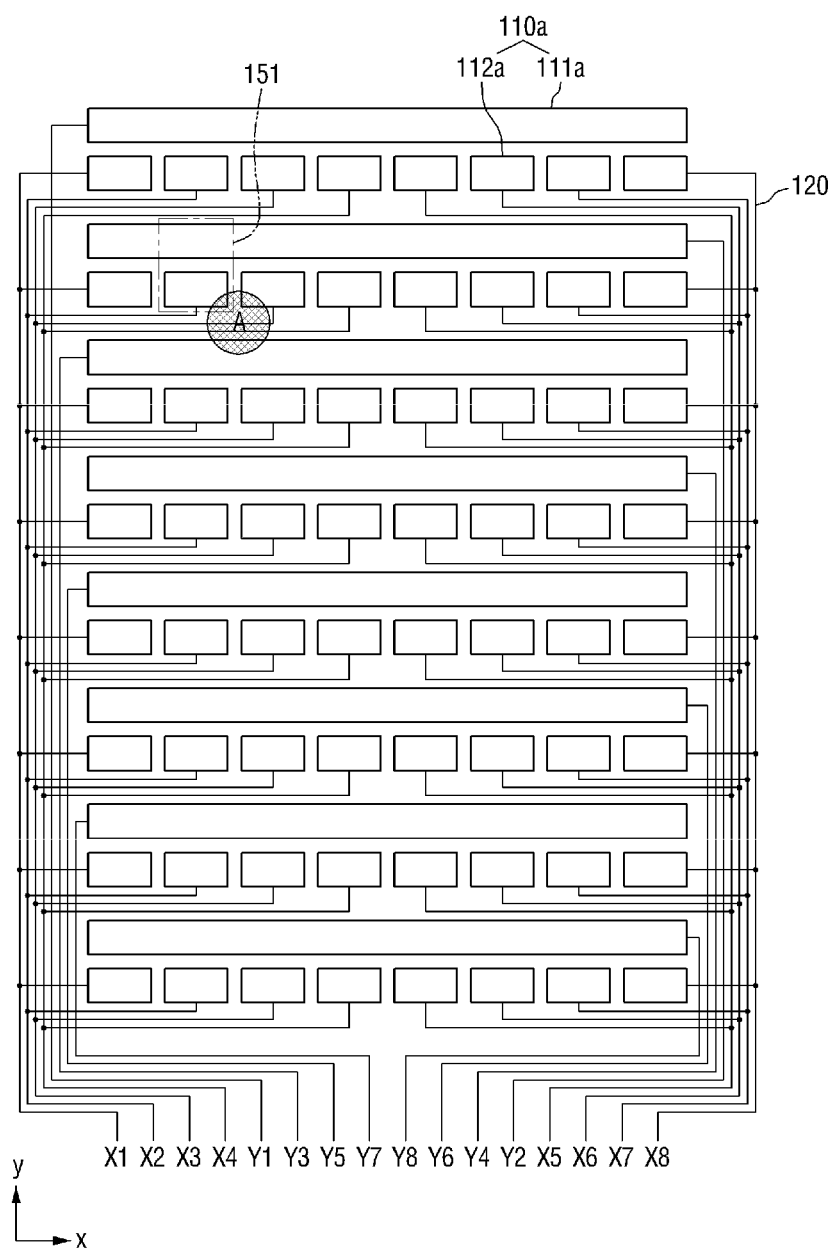
FIG. 14 is a plane view of a touch panel according to another embodiment of the disclosure.
Figure 15:
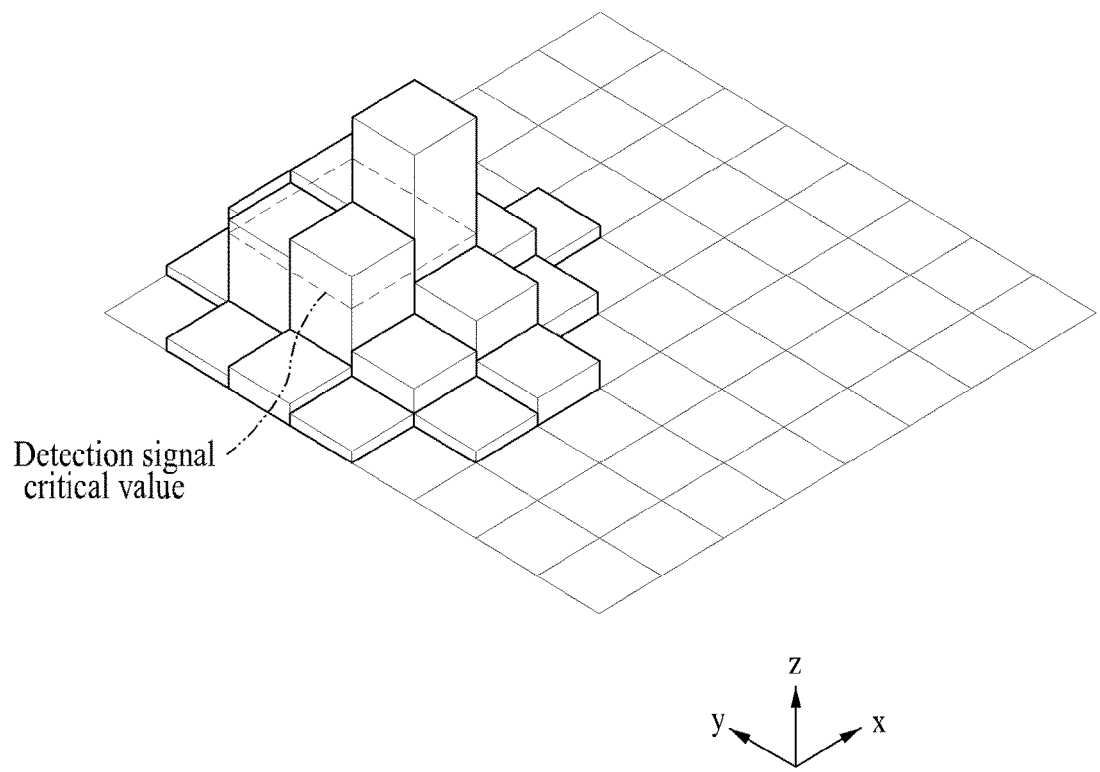
FIGS. 15, 16, 17 and 18 are graphs to describe driving of a touch detecting apparatus according to exemplary embodiments of the disclosure.

FIG. 14 is a plane view of a touch element according to a still further and FIG. 15 is a graph illustrating a detection signal and a detection signal value. FIG. 14 shows an example for realizing the touch element shown in FIG. 2 and the touch element shown in FIGS. 3 through 5 or other type touch elements may be applicable.

In FIG. 14, 8 first touch detection electrodes 111a are arranged in parallel. Second touch detection electrodes 112a form 8 lines and 8 second touch detection electrodes 112a are arranged in one line. A touch region where a user touch is input is shown as "A".

In the mutual capacitive overlay touch element, a driving signal is applied to the second touch detection electrode 112a and only the first touch detection electrode 111a receives a detection signal. A detection cell 151 may be a region one second touch detection electrode 112a and a predetermined portion of the first touch detection electrode 111a with a wide corresponding to one second touch detection electrode 112a.

When the touch element is driven as the mutual capacitive overlay touch element, a driving signal is applied to a predetermined number of second touch detection electrodes 112a. In some embodiments, a driving signal is sequentially applied to second touch detection electrodes 12a located in the same column out of the second touch detection electrodes 112a located in each line. For instance, when a driving signal is applied to second touch detection electrodes 112a located in the leftmost column via a wire (X1), a ground level voltage may be applied to second touch detection electrodes 112a located in the other columns via the other wires (X2 through X8). After that, a driving signal may be applied to second touch detection electrodes 112a located in the second column from the leftmost and a driving signal may be sequentially applied to second touch detection electrodes 112a located in the other columns.

When a touch is input to the touch element, there is variable of the mutual capacitance between the first touch detection electrode 111a and the second touch detection electrode 112a. Such variation of the mutual capacitance may be received in the first touch detection electrode 111a and transferred to the receiving unit 210 via each of the wires (Y1 through Y8). The receiving unit 210 may map a correlation between the detection signal and the detection signal value, using the detection signals input from the wires (Y1 through Y8).

FIG. 15 is a graph illustrating a correlation between the detection signal input to the receiving unit 210. and the detection signal value. The graph shows the correlation between the detection signal and the detection signal value, in case there is a touch input in the touch region of FIG. 14. The detection signal value means the size of the detection signal. As the mutual capacitance generated by the touch is getting larger, in other words, the touch input detected by the first touch detection electrode 111a is getting larger, the detection signal value is getting larger.

As mentioned above, the detection signal critical value refers to the minimum detection signal value which is a standard for determining presence of touch input. When the size of the detection signal value from one touch detection electrode 110a is larger than the detection signal critical value, it may be determined that there is the user touch input to the corresponding touch detection electrode 110a.

For instance, it is assumed that a touch input is applied to "A" region of the touch element shown in FIG. 14. In this instance, the touch region is overlapped with detection cells 151 located in the second and third columns from the leftmost out of detection cells 151 located in the second line and detection cells 151 located in the second and third columns from the leftmost one out of detection cells 151 located in the third line. Accordingly, a detection signal value corresponding to the corresponding detection cell 151 out of the detection signals received by the receiving unit 210 is larger than the detection signal critical value.

An actual touch region is overlapped with detection cells 151 located in the second and third columns from the leftmost one out of detection cells 151 located in the second line and detection cells 151 located in the second and third columns from the leftmost one out of detection cells 151 located in the second line. A preset detection signal value may be generated in a neighboring electrode with respect to the corresponding detection cell by a capacitance with a touch object or a mutual capacitance with the touched detection electrode. A direct touch input is not applied to the detection signal value and the detection signal value is smaller than the detection signal critical value. In the graph of FIG. 15, a detection signal value not corresponding to the detection cells 151 located in the second and third columns from the leftmost one out of the detection cells 151 located in the second line and the detection cells 151 located in the second and third columns from the leftmost one out of the detection cells 151 located in the third line may be smaller than the detection signal critical value.

The maximum detection signal value of the individual detection signal values may be extracted by the signal extracting unit 220 and the extracted value is input to the calculating unit 240. The calculating unit 240 may calculate an adjustment variable. When the maximum detection signal value is smaller than the detection signal value limit, the calculated adjustment variable may be zero. Accordingly, the calculating unit 240 outputs the adjustment detection signal value which is the same as or substantially identical to the detection signal values output from the signal extracting unit 220. A touch determination unit 250 may compare the adjustment detection signal value with the detection signal critical value, to detect a coordinate of the touch region and output the result of the detection.

Figure 16:
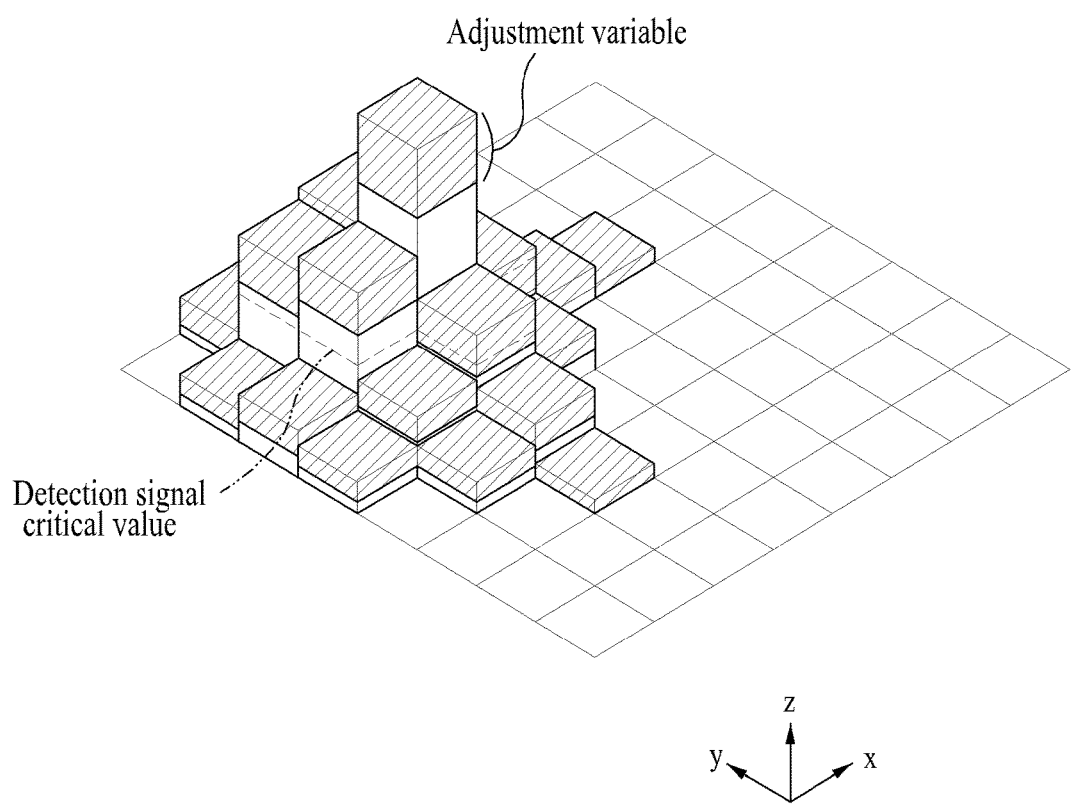

FIG. 16 is a graph showing a relation between a detection signal and a detection signal value, in case noise is generated. FIG. 16 is the same as FIG. 15, except that a noise value generated by a rear surface touch is added to the detection signal value of FIG. 15.

Referring to the graph of FIG. 16, it is identified that the noise generated by the rear surface touch is added to each of the detection signal values. Assuming that the detection cell 151 having the strongest touch input is a detection cell 151 located in the third line and the third column, a noise value corresponding to the detection cell 151 located in the third line and the third column is the largest. The noise value is reduced more and more, as getting farther from the detection cell 151.

The calculating unit 240 calculates an adjustment variable, using a value gained by deducting the detection signal value limit from the maximum detection signal value. For instance, the adjustment variable is the value gained by subtracting the detection signal value limit from the maximum detection signal value.

In the graph of FIG. 16, a detection signal value in the detection cell 151 located in the third line and the third column is the maximum detection signal value and the adjustment variable may be acquired, using the value gained by deducting the detection signal value limit from the detection signal value of the detection cell 151 located in the third column.

The adjustment factor may be used in calculating the adjustment detection signal value after adjusting the detection signal value. In the graph of FIG. 16, corresponding detection signal values to detection cells 151 located in the fourth column from the leftmost out of detection cells 151 located in the third line and a detection cell 151 located in the third column from the leftmost one out of detection cells 151 located in the fourth line are larger than the detection signal critical value by the influence of the noise generated by the rear surface touch, even though not touch is applied to detection electrodes connected to the cells. However, the size of the signal values may be smaller than the detection signal critical value, while the adjustment detection signal value is calculated, using the adjustment variable, such that an error of the touch detecting apparatus caused by noise can be prevented and the accuracy of the touch detection can be enhanced.

Hereinafter, referring to FIGS. 17 and 18, a method for calculating the calculating unit 240 calculating the adjustment detection signal value will be described in detail, according to diverse embodiments of the disclosure.

Figure 17:
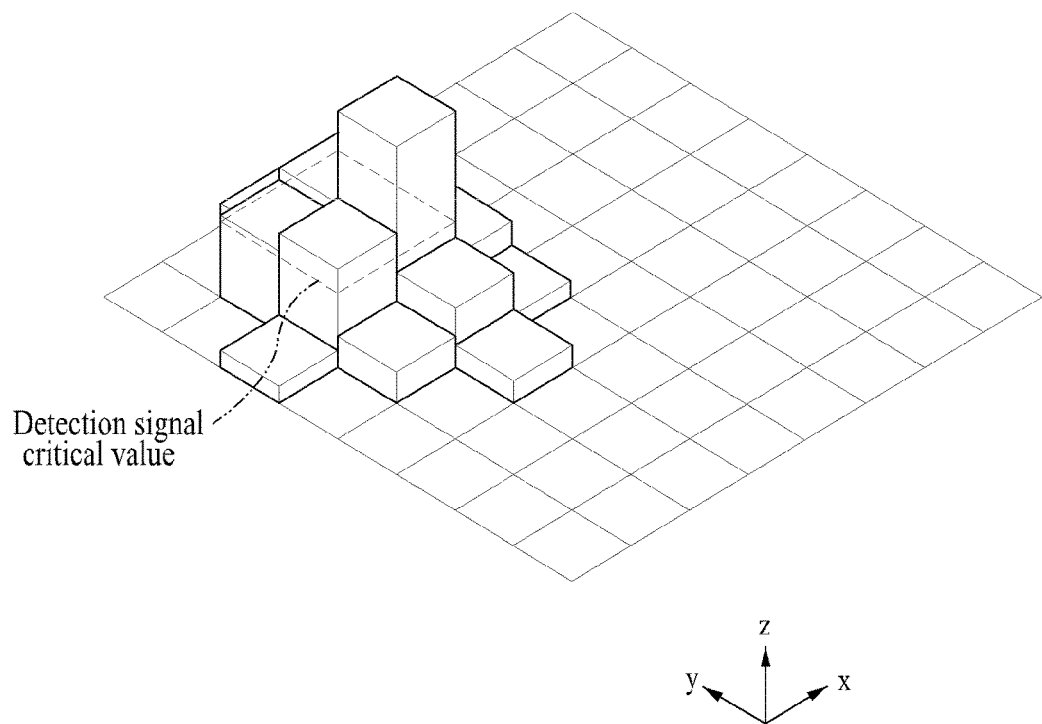

FIG. 17 is a graph showing a relation between the adjustment detection signal value generated by the calculating unit 240 and the detection signal according to embodiments of the disclosure. FIG. 17 shows the result of the calculation of the adjustment detection signal value after calculating a corresponding adjustment factor for each of the detection signal values of FIG. 16.

In the present embodiment, an adjustment detection signal is gained to deduct an adjustment variable of each group from an adjustment signal value in a lump sum. Here, the adjustment variable may be a value gained by deducting the detection signal value limit from the maximum detection signal value. The adjustment variable is deducted from the detection signal value and the adjustment detection signal value is calculated, which is the same as the embodiment shown in FIG. 11. Repeated description is omitted accordingly.

As a modified embodiment of the present embodiment, the adjustment detection signal value may be gained by deducting a specific constant, not the adjustment variable, from the detection signal. The adjustment detection signal value is calculated, using the specific constant, which is the same as the embodiment of FIG. 11. Repeated description is omitted accordingly.

As another modified embodiment, the adjustment detection signal value may be gained by deducting the product of the adjustment variable of each group and the adjustment factor from the detection signal value in a lump sum. Deducting the product of the adjustment variable and the adjustment factor from the detection signal value in a lump sum is the same as the embodiment of FIG. 12 and repeated description is omitted accordingly.

Figure 18:
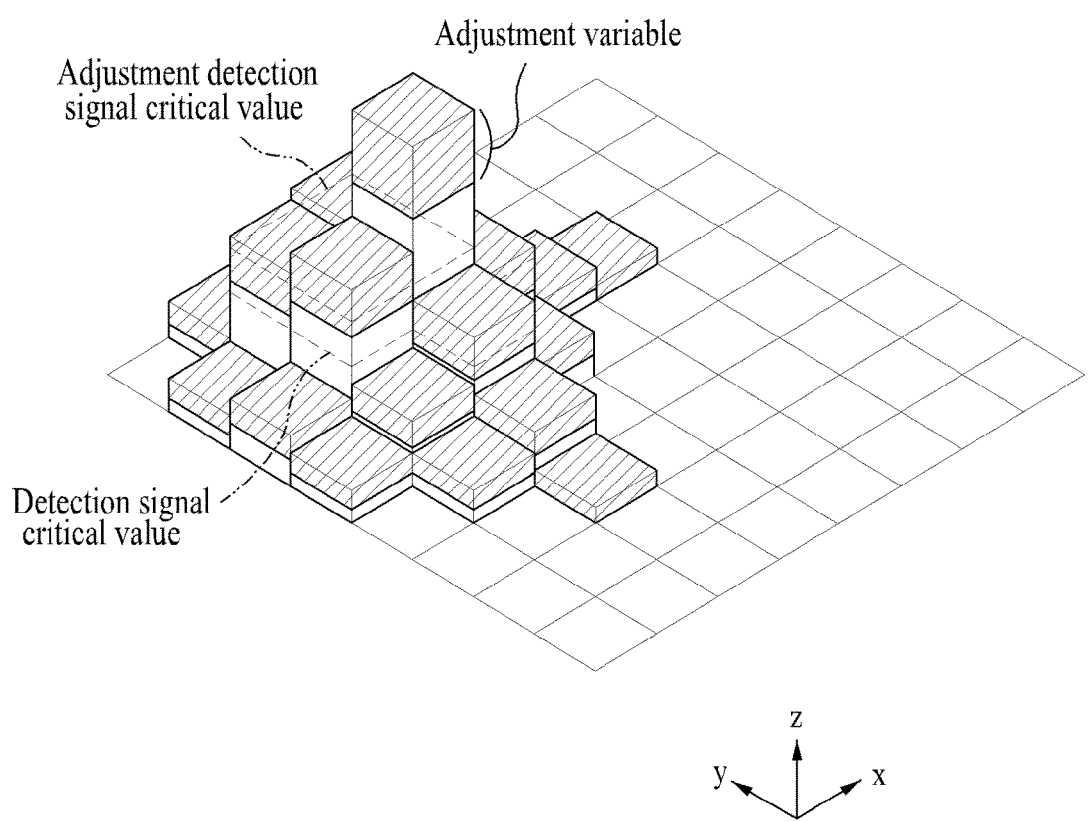

FIG. 18 is a graph showing a relation between a detection signal value calculated by a calculating unit 240 according to still further embodiments and a detection signal. Referring to FIG. 18, the calculating unit 240 according to embodiments of the disclosure may not calculate the detection signal value, using the adjustment variable. Instead, the calculating unit 240 may calculate (e.g., add) an adjustment variable, using a detection signal critical value and generate an adjustment detection signal, to determine presence of touch in the touch element, using the adjustment detection signal critical value. The generating of the adjustment detection signal critical value, using the calculating the adjustment variable to the detection signal critical value is the same as the embodiment of FIG. 13 and repeated description is omitted accordingly.

Although not shown in the drawings, a touch detecting apparatus according to a still further embodiment may determine the number of touches in a touch element, using a detection signal; calculate a normal detection rate based on the number of the touches; generate an adjustment detection signal value, using an adjustment variable; calculate a rate of detection signal values larger than a detection signal critical value out of the adjustment detection signal; and compare the calculated rate with a normal rate to determine whether to perform re-adjustment.

In a state where noise is removed or in a normal state with no noise, the number of detection signal values larger than the detection signal critical value is not larger than a specific number out of the detection signal values detected by touch detection electrodes of the touch element. For instance, the specific number may be the number of initially input touches. To determine whether the noise is removed completely, the number of the touches in the touch element is determined, using the initially input detection signal, and the normal detection rate may be calculated based on the number of touches. The normal detection rate may mean a rate of the detection signal values over the detection signal critical value of the total detection signal values which can be generated, corresponding to the number of the corresponding touches. For instance, when one touch is input to the touch element having a preset size, a rate of the detection signal values over the detection signal critical value out of the total detection signal values is 5% and the number of the touches determined, using the initially input detection signal is 3. At this time, a normal detection rate may be 15%.

After calculating the normal detection rate, a rate of the detection signal values over the detection signal critical value out of the adjusted detection signal values may be calculated and the calculated rate may be compared with the normal detection rate, such that it can be determined whether noise is removed completely based on the result of the comparison. Unless the noise is removed completely, in other words, the rate of the detection signal values over the detection signal critical value out of the adjusted detection signal values is higher than the normal detection rate, re-adjustment may be performed. The re-adjustment may be performed according to diverse methods for removing noise.

Although not shown in the drawings, a touch detecting apparatus according to a still further embodiment may generate an adjustment detection signal value, using an adjustment variable. When there is an adjustment detection signal value lower than a specific rate of the detection signal value limit out of the adjustment detection signal, the adjustment detection signal value lower than the specific rate of the detection signal value limits may be re-adjusted as zero. In some embodiments, a specific rate of the detection signal value limits may be approximately 5% of the detection signal value.

Figure 19:
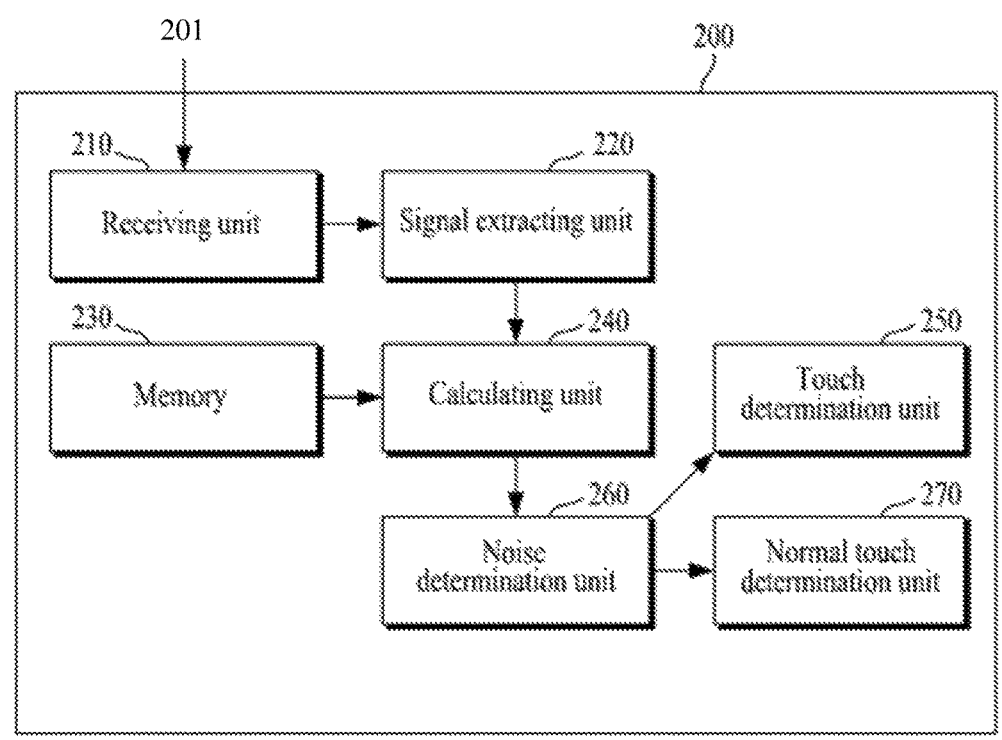
FIG. 19 is a block diagram of a touch panel control unit according to another embodiment of the disclosure.

FIG. 19 is a block diagram of a touch element controller according to another embodiment of the disclosure. The touch element controller 200 includes a receiving unit 210, a signal extracting unit 220, a memory 230, a calculating unit 240, a touch determination unit 250, a noise determination unit and a normal touch determination unit 250. The touch element controller according to this embodiment is the same as the touch element controller according to the embodiment of FIG. 6, except the noise determination unit and the normal touch determination unit 250, and repeated description is omitted accordingly.

The noise determination unit extracts presence of the noise generated by the rear surface touch. The noise determination unit may receive the adjustment variable gained by deducting the detection signal value limit from the maximum detection signal value from the calculating unit 240. If there is the noise generated by the rear surface touch, the maximum detection signal value is larger than the detection signal value limit. The noise determination unit may determine that there is the noise, when the adjustment variable is larger than zero and that there is no noise, when the adjustment variable is smaller than zero.

The normal touch determination unit 250 is configured to determine presence of touch in the touch element 100 and it may be used in determining presence of the touch, in a state where there is no noise. The normal touch determination unit 250 is used in a state where there is no noise and it may determine normal touch, directly using the detection signals acquired from the touch detection electrodes without auxiliary calculating.

When it is determined by the noise determination unit that there is noise, the noise has to be removed to improve the accuracy of the touch detection. Accordingly, once determining that there is noise, the touch determination unit 250 described, referring to FIGS. 6 through 18 may be driven. However, when determining that there is the noise, the noise determination unit has to remove the noise to improve the accuracy of the touch detection. Accordingly, once it is determined that there is the noise, the touch determination unit 250 described, referring to FIGS. 6 through 18, may be driven. However, once it is determined that there is no noise, the touch determination unit 250 is not required to be driven and may determine presence of touch, directly using a current state detection signal value.

Figure 21:
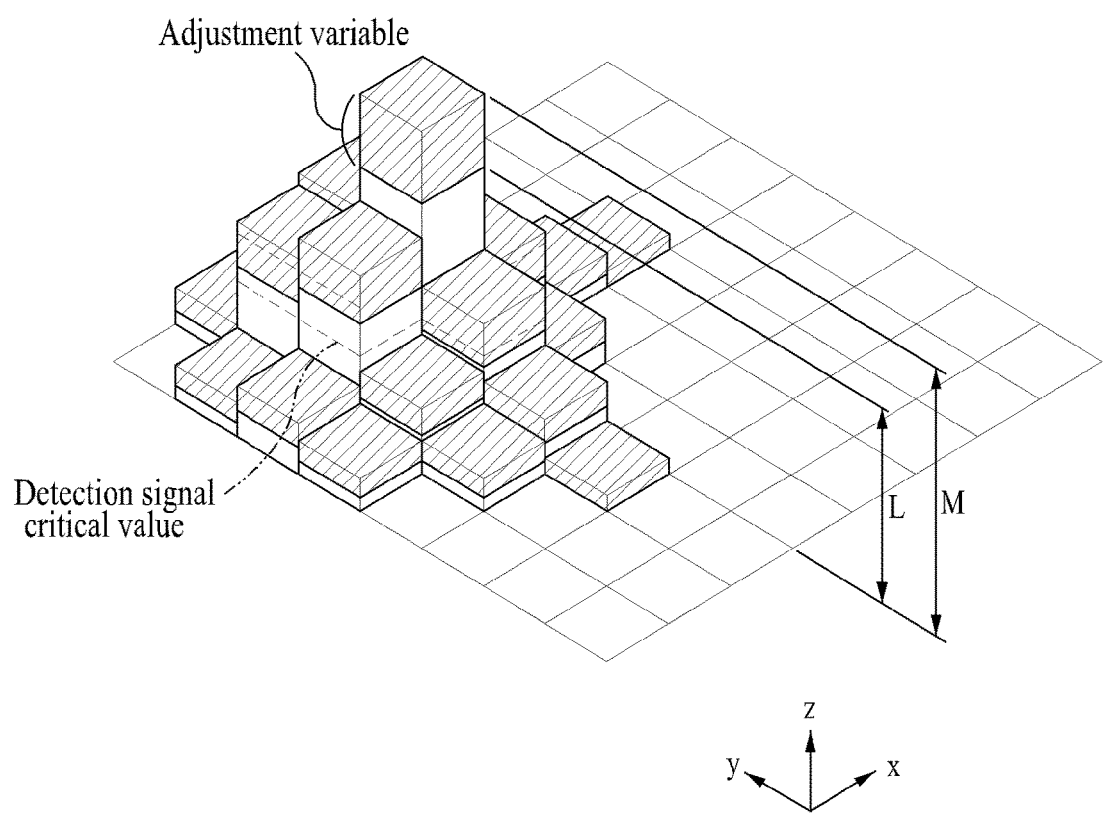

FIGS. 20 and 21 are graphs showing a relation between the detection signal and the adjustment detection signal value generated by the calculating unit 240 of the touch detecting apparatus according to a still further embodiment.

In this embodiment, the adjustment detection signal value may be gained by multiplying the detection signal value by the adjustment variable. The adjustment variable may mean a rate of the detection signal value limit to the maximum detection signal value (the detection signal value limit (L1, L2 and L)/the maximum detection signal value (M1, M2 ad M)). The adjustment variable is smaller than 1 and the adjustment detection signal value is getting smaller than an original detection signal value, such that the noise can be removed similar to the embodiment mentioned above.

The touch determination unit 250 may determine presence of touch in the touch element 100, using the adjustment variable. The adjustment detection signal value is gained by multiplying the detection signal values of the detection signals by the adjustment variable, to determine presence of touch in the touch element 100, using the adjustment detection signal value. The driving method of the touch determination unit 250 using the adjustment is the same as the embodiments shown in FIGS. 10 through 13 and through 16 through 18 and repeated description is omitted accordingly.

Figure 22:
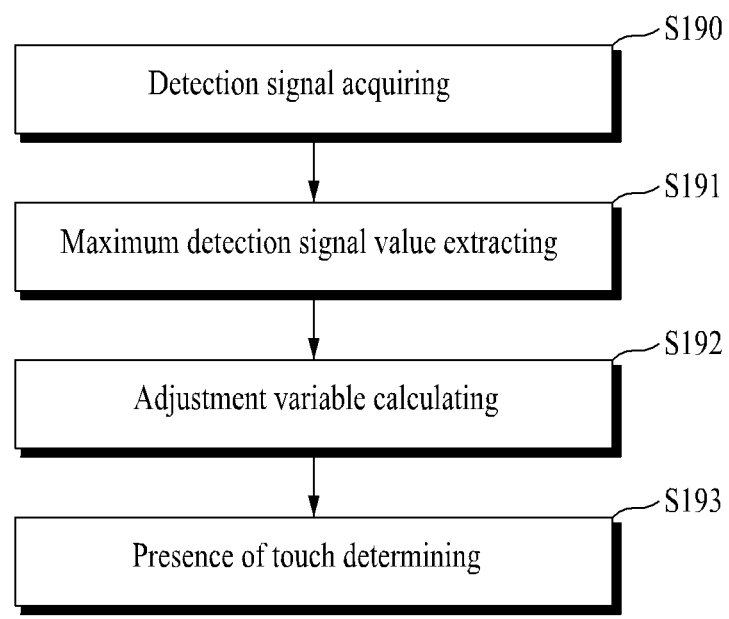
FIG. 22 is a flow chart of a method for detecting touch according to one embodiment of the disclosure.

FIG. 22 is a flow chart of a method for detecting touch according to one embodiment of the disclosure.

In the method for detecting the touch according to this embodiment, the detection signals generated by touch are acquired and grouped into one or more groups (S190). The acquiring of the detection signals generated by the touch may include acquiring of detection signals from the touch detection electrodes arranged in the touch element.

Hence, the maximum signal value is extracted from the detection signal values of the detection signals for each group (S191). Each of the detection signals may have a different detection signal value in accordance with a touch level or a touch area. In other words, the size of the capacitance in accordance with touch is proportional directly to a touch area and inversely to a touch distance. When the user's touch level is high, the detection signal value is large. When the user touch level is low, the value is small. When the user's touch area is wide, the detection signal value is large. When the user's touch area is narrow, the detection signal value is small. Accordingly, the maximum detection signal value may mean the detection signal value acquired from the touch detection electrode receiving the highest user touch level or the widest user touch area.

Hence, the adjustment variable is extracted by deducting the detection signal value from the maximum detection signal valve (S192). Related to the touch detecting apparatus, the detection signal value limit may mean the maximum detection signal value which can be detected by touch in a normal state.

The calculating the adjustment variable may include calculating the adjustment variable by deducting the detection signal value limit from the maximum detection signal value. The calculating of the adjustment variable by deducting the detection signal value limit from the maximum detection signal value is the same as the calculation mentioned, referring to FIGS. 10 and 16, and repeated description is omitted accordingly.

The calculating the adjustment variable may include calculating the adjustment variable at a rate of the detection signal value limit to the maximum detection signal value. The calculating of the adjustment variable at the rate of the detection signal value limit to the maximum detection signal value is the same as the calculating mentioned in the embodiment, referring to FIGS. 20 and 21, and repeated description is omitted accordingly.

After that, it is determined whether there is touch in the touch element, using the calculated adjustment variable (S193).

The determination of presence of touch may include generating the adjustment detection signal value by deducting the adjustment variable from the detection signal values of the detection signals and determining presence of touch in the touch element, using the adjustment detection signal value generated. The generating of the adjustment detection signal value by deducting the adjustment variable from the detection signal values is the same as the embodiment shown in FIGS. 11 and 17 and repeated description is omitted accordingly.

The determination of the presence of touch may include generating the adjustment detection signal value by deducting the product of the adjustment variable and the adjustment factor from the signal values and determining presence of touch in the touch element, using the adjustment detecting signal value. Adjustment factor may be defined different for each of the detection signals. A large value of an adjustment factor may be defined for the detection signal value from the touch detection electrode 110a receiving the rear surface touch. A relatively small value may be defined for the detection signal value from the touch detection electrode 110a receiving no rear surface touch. For instance, the adjustment factor has the maximum value for the detection signal having the maximum detection signal and the size of the adjustment factor may be reduced based on a distance from the touch detection electrode 110a detecting the detection signal having the maximum detection signal value. The adjustment factor may be set in accordance with a relative quantity of noise, based on noise distribution caused by the rear surface touch. In some embodiments, the adjustment factor may be 0 or more or 1 or less. The generating of the adjustment detection signal value by deducting the product of the adjustment variable and the adjustment factor from the detection signal value is the same as the embodiment shown in FIG. 12 and repeated description is omitted accordingly.

The determination of presence of touch may include grouping the touch detection electrodes into one or more groups in accordance with a region of the touch element; generating the adjustment detection signal value by deducting the product of the adjustment variable and the adjustment from the detection signal values of the detection signals for the grouped touch detection electrodes; and determining presence of touch in the touch element, using the adjustment detection signal values. The touch electrodes are grouped and the adjustment factor may be defined from each of the groups, which is the same as the embodiment of FIG. 7. Repeated description thereof is omitted accordingly.

The determination of the presence of touch may include generating the adjustment detection signal critical value by adding the adjustment variable to the signal critical value; and determining presence of touch in the touch element, using the adjustment detection signal critical value. The generating of the adjustment signal critical value by adding the adjustment variable to the detection signal critical value is the same as the embodiment shown in FIGS. 13 and 18 and repeated description is omitted accordingly.

Figure 23:
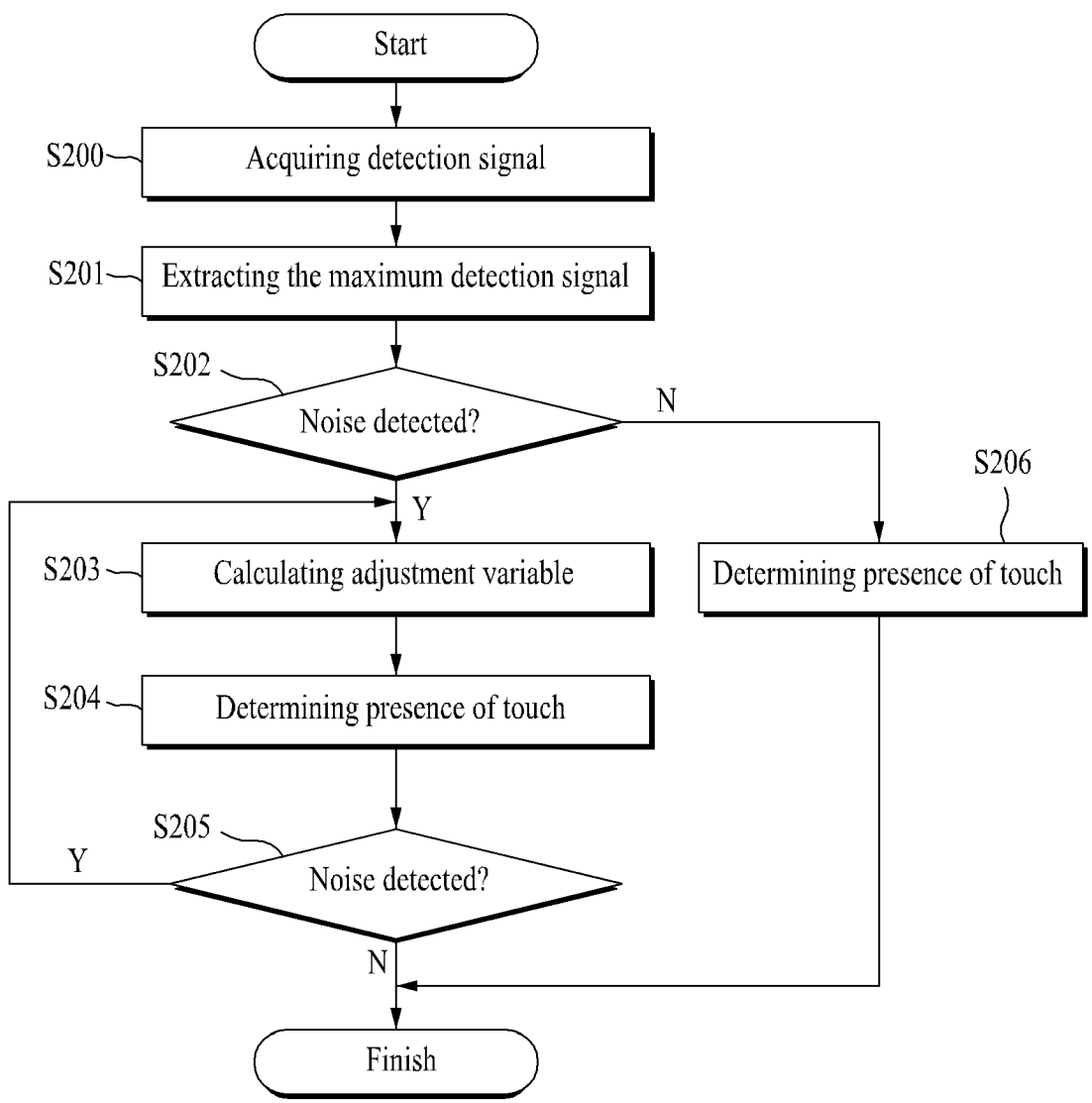
FIG. 23 is a flow chart of a method for detecting touch according to another embodiment of the disclosure.

FIG. 23 is a flow chart of a method for detecting touch according to another embodiment of the disclosure.

The method for detecting the touch according to this embodiment may include acquiring detection the signal values generated by touch and grouped into one or more detection groups (S200); and extracting the maximum signal value out of detection signals of detection signals for each of the groups (S201). The acquiring of the detection signals and the extracting of the maximum detection signal value may be the same as the acquiring and the extracting shown in FIGS. 13 and 18. Repeated description is omitted accordingly.

Hence, presence of the noise generated by the rear surface touch may be detected (S202). To extract the presence of the noise, the maximum detection signal value may be compared with the detection signal value limit. When the maximum detection signal value is larger than the detection signal value limit, it may be determined that there is the noise generated by the rear surface touch. When the maximum detection signal value is smaller than the detection signal value limit, it may be determined that there is no noise generated by the rear surface touch.

Once it is determined that there is the noise, the adjustment variable is calculated, using the maximum detection signal value and the detection signal value limit (S203). The calculating of the adjustment variable, using the maximum detection signal value and the detection signal value limit, is the same as the calculating shown in FIG. 22. Repeated description is omitted accordingly.

Hence, it is determined whether there is touch in the touch element, using the adjustment variable (S204). The determination of presence of touch in the touch element is the same as the determination shown in FIG. 22 and repeated description is omitted.

After that, it is determined whether to re-adjust noise (S146). The determination whether to re-adjust the noise may include determining the number of touches in the touch element, using the detection signals; calculating a normal detection rate based on the determined number of the touches; generating the adjustment detection signal value, using the adjustment variable; calculating a rate of the adjustment detection signal values larger than the detection signal critical value out of the adjustment detection signal values; and determining whether to perform re-adjustment based on the result of comparing the rate with a normal detection rate.

In a normal state where noise is removed or where there is no noise, the number of the detection signal values larger than the detection signal critical vale out of the detection signal values detected by the touch detection electrodes of the touch element may be a specific number or less. For instance, the specific number may be the number of the touches initially input. Accordingly, to determine whether the noise is removed completely, the touch element determines the number of touches, using the initially input detection signal and calculates the normal detection rate based on the number of the touches. Here, the normal detection rate may mean a rate of the detection signal values larger than the detection signal critical value out of the total detection signal values which can be generated, corresponding to the number of the touches. For instance, when one touch is input to the touch element having a preset size, a rate of the detection signal values over the detection signal critical value out of the total detection signal values is 5% and the number of the touches determined, using the initially input detection signal is 3. At this time, a normal detection rate may be 15%.

In calculating the normal detection rate, the rate of the detection signal values larger than the detection signal critical value out of the adjusted detection signal values may be calculated and the calculated rate may be compared with the normal detection rate, to determine whether the noise is removed completely. Unless the noise is removed completely, in other words, when the rate of the detection signal values which are the detection signal critical value or less is larger than the normal detection rate, re-adjustment may be performed. The re-adjustment may be performed according to diverse methods for removing the noise.

If it is determined to re-adjust the noise, S203 is performed and the adjustment variable is re-calculated, only to re-determine presence of touch.

Once it is determined in S202 that there is no noise, detection signals may be acquired from the touch detecting electrodes and it can be determined whether there is touch in the touch element (S206). Once it is determined that there is no noise, the same process as FIG. 19 is performed and repeated description is omitted accordingly.

Various variations and modifications of the refrigerator described above are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for detecting touch comprising:
a touch element comprising a plurality of touch detecting electrodes arranged therein; and
a touch element controller for acquiring detection signals from the touch detection electrodes and determining presence of touch in the touch element,
wherein the touch element controller comprises,
a receiving unit for receiving the detection signals from the touch detection electrodes and grouping the detection signals into one or more detection signal groups;
a memory for storing a detection signal value limit that represents a maximum value of a detection signal that is indicative that the touch element is touched;
a signal extracting unit for determining for each of the one or more detection signal groups a maximum detection signal value from amongst the detection signals included in the detection signal group;
a calculating unit for calculating an adjustment variable for each of the detection signal groups by deducting the detection signal value limit from the maximum detection signal value in the detection signal group; and
a touch determination unit for:
adjusting each of the detection signals in each of the one or more detection signal groups by deducting a product of the adjustment variable for the detection signal group and an adjustment factor for the detection signal from the detection signal, a magnitude of the adjustment factor for each detection signal based on a magnitude of noise caused by a rear surface touch of a touch detection electrode that generated the detection signal; and
determining presence of touch in the touch element based on whether the adjusted detection signals included in each of the detection signal groups is greater than a detection signal critical value that describes a minimum value of a detection signal that is indicative that the touch element is touched.

2. The apparatus for detecting the touch of claim 1, wherein the adjustment factor has the maximum value in a detection signal having the maximum detection signal value, and
the size of the adjustment factor is reduced based on a distance with a touch detection electrode in which the detection signal having the maximum detection signal value is detected.

3. The apparatus for detecting the touch of claim 1, wherein the touch determination unit generates the detection signal critical value by adding the adjustment variable to the detection signal critical value for each of the detection signal groups.

4. The apparatus for detecting the touch of claim 1, wherein the touch determination unit:
determines a number of touches of the touch element, using the detection signals,
calculates a normal detection rate based on the number of touches,
generates the adjusted detection signals based on the adjustment variable,
calculates a rate of adjusted detection signals that are larger than the detection signal critical values out of the adjusted detection signals, and
determines whether to perform re-adjustment by comparing the calculated rate with a normal detection rate.

5. The apparatus for detecting the touch of claim 1, wherein the calculating unit calculates the adjustment variable responsive to determining that the extracted maximum detection value is greater than the detection signal value limit.

6. An apparatus for detecting touch comprising:
a display panel for displaying an image;
a display panel controller for driving the display panel;
a touch element arranged on one surface of the display panel, the touch element comprising a plurality of touch detecting electrodes arranged therein; and
a touch element controller for acquiring detection signals from the touch detection electrodes and determining presence of touch in the touch element,
wherein the touch element controller comprises,
a receiving unit for receiving the detection signals from the touch detection electrodes and grouping the detection signals into one or more detection signal groups;
a memory for storing a detection signal value limit that represents a maximum value of a detection signal that is indicative that the touch element is touched;
a signal extracting unit for determining for each of the one or more detection signal groups a maximum detection signal value from amongst the detection signals included in the detection signal group;
a calculating unit for calculating an adjustment variable for each of the detection groups by deducting the detection signal value limit from the maximum detection signal value in the detection signal group; and
a touch determination unit for:
adjusting each of the detection signals in each of the one or more detection signal groups by deducting a product of the adjustment variable for the detection signal group and an adjustment factor for the detection signal from the detection signal, a magnitude of the adjustment factor for each detection signal based on a magnitude of noise caused by a rear surface touch of a touch detection electrode that generated the detection signal; and
determining presence of touch in the touch element, based on whether the adjusted detection signals included in each of the detection signal groups is greater than a detection signal critical value that describes a minimum value of a detection signal that is indicative that the touch element is touched.

7. An apparatus for detecting touch comprising:
a touch element comprising a plurality of touch detection electrodes comprising a plurality of first touch detection electrodes and a plurality of second touch detection electrodes; and
a touch element controller for applying a driving signal a predetermined number of the second touch detection electrodes and determining presence of touch in the touch element by acquiring detection signals generated between the first touch detection electrodes and the second touch detection electrodes,
wherein the touch element controller comprises,
a receiving unit for receiving the detection signals from the first touch detection electrodes;
a memory for storing a detection signal value limit that represents a maximum value of a detection signal that is indicative that the touch element is touched;
a signal extracting unit for determining for each of the one or more detection signal groups a maximum detection signal value from amongst the detection signals included in the detection signal group;
a calculating unit for calculating an adjustment variable for each of the detection signal groups by deducting the detection signal value from the maximum detection signal value in the detection signal group; and a touch determination unit for:

adjusting each of the detection signals in each of the one or more detection signal groups by deducting a product of the adjustment variable for the detection signal group and an adjustment factor for the detection signal from the detection signal, a magnitude of the adjustment factor for each detection signal based on a magnitude of noise caused by a rear surface touch of a touch detection electrode that generated the detection signal; and determining presence of touch in the touch element, based on whether the adjusted detection signals included in each of the detection signal groups is greater than a detection signal critical value that describes a minimum value of a detection signal that is indicative that the touch element is touched.

8. The apparatus for detecting the touch of claim 7, wherein the adjustment factor has the maximum value in a detection signal having the maximum detection signal value, and the size of the adjustment factor is reduced based on a distance with a touch detection electrode in which the detection signal having the maximum detection signal value is detected.

9. The apparatus for detecting the touch of claim 7, wherein the touch determination unit generates the detection signal critical value by adding the adjustment variable to the detection signal critical value for each of the detection signal groups.

10. The apparatus for detecting the touch of claim 7, wherein the touch determination unit:

determines a number of touches of the touch element, using the detection signals, calculates a normal detection rate based on the number of touches, generates the adjusted detection signals based on the adjustment variable, calculates a rate of adjusted detection signals that are larger than the detection signal critical values out of the adjusted detection signals, and determines whether to perform re-adjustment by comparing the calculated rate with a normal detection rate.

11. The apparatus for detecting the touch of claim 7, wherein the calculating unit calculates the adjustment variable responsive to determining that the extracted maximum detection value is greater than the detection signal value limit.

12. A method for detecting touch comprising:

generating detection signals and acquiring the detection signals that are grouped into one or more detection signal groups;

determining for each of the one or more detection signal groups a maximum detection signal value from amongst the detection signals included in the detection signal group;

calculating an adjustment variable for each of the detection signal groups by deducting a detection signal value limit from the maximum detection signal value in the detection signal group;

adjusting each of the detection signals in each of the one or more detection signal groups by deducting a product of the adjustment variable for the detection signal group and an adjustment factor for the detection signal from the detection signal, a magnitude of the adjustment factor for each detection signal based on a magnitude of noise caused by a rear surface touch of a touch detection electrode that generated the detection signal; and determining presence of touch in a touch element based on whether the adjusted detection signals included in each of the detection signal groups is greater than a detection signal critical value that describes a minimum value of a detection signal that is indicative that the touch element is touched.

13. The method for detecting the touch of claim 12, wherein the adjustment factor has the maximum value in a detection signal having the maximum detection signal value, and the size of the adjustment factor is reduced based on a distance with a touch detection electrode in which the detection signal having the maximum detection signal value is detected.

14. The method for detecting the touch of claim 12, wherein the acquiring of the detection signals comprises acquiring the detection signals from touch detection electrodes of the touch element, and the determining of the presence of the touch comprises, grouping the touch detection electrodes in accordance with a region of the touch element;

generating the adjusted detection signal by deducting a product of the adjustment variable and an adjustment factor from the detection signals for each of the grouped touch detection electrodes; and determining presence of touch in the touch element, using the adjusted detection signals, and the adjustment factor is defined different for each of the touch detection electrode group.

15. The method for detecting the touch of claim 12, wherein the determining of the presence of the touch comprises, generating the detection signal critical value by adding the adjustment variable to a detection signal critical value for each of the detection signal groups.

16. The method for detecting the touch of claim 12, further comprising:

determining whether to re-adjust noise, wherein the determining whether to re-adjust the noise comprises, determining a number of touches in the touch element, using the detection signals;

extracting a normal detection rate based on the number of the touches;

generating an adjusted detection signal, using the adjustment variable;

calculating a rate of adjusted detection signals that are larger than the detection signal critical value; and determining whether to re-adjust noise by comparing the calculated rate with the normal detection rate.

17. The method for detecting the touch of claim 12, wherein the adjustment variable is calculated responsive to determining that the extracted maximum detection value is greater than the detection signal value limit.

18. A method for detecting touch comprising:

generating detection signals and acquiring the detection signals that are grouped into one or more detection signal groups;

determining for each of the one or more detection signal groups a maximum detection signal value from amongst the detection signals included in the detection signal group;

calculating an adjustment variable based on a ratio of a detection signal value limit and the maximum detection signal value, the maximum detection signal value representing a maximum value of a detection signal that is indicative that the touch element is touched;

adjusting each of the detection signals in each of the one or more detection signal groups by deducting a product of the adjustment variable and an adjustment factor for the detection signal from the detection signal, a magnitude of the adjustment factor for each detection signal based on a magnitude of noise caused by a rear surface touch of a touch detection electrode that generated the detection signal; and determining presence of touch in a touch element based on the adjusted detection signals and a detection signal critical value that describes a minimum value of a detection signal that is indicative that the touch element is touched.

\* \* \* \* \*